US012631717B2

(12) United States Patent
Li et al.

(10) Patent No.: US 12,631,717 B2
(45) Date of Patent: May 19, 2026

(54) METHOD FOR ESTIMATING TIME OF ARRIVAL BASED ON NON-CONTIGUOUS SPECTRUMS AND APPARATUS

(71) Applicant: HUAWEI TECHNOLOGIES CO., LTD., Shenzhen (CN)

(72) Inventors: Cheng Li, Shanghai (CN); Su Huang, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 18/335,694

(22) Filed: Jun. 15, 2023

(65) Prior Publication Data

US 2023/0324502 A1 Oct. 12, 2023

Related U.S. Application Data

(63) Continuation of application No. PCT/CN2020/136630, filed on Dec. 16, 2020.

(51) Int. Cl.
| | |
|---|---|
| *H04W 4/029* | (2018.01) |
| *G01S 5/02* | (2010.01) |
| *G01S 5/10* | (2006.01) |

(52) U.S. Cl.
CPC .............. G01S 5/10 (2013.01); G01S 5/0226 (2013.01)

(58) Field of Classification Search
CPC ..... H04L 5/0048; H04L 5/001; H04L 5/0051; H04L 5/0094; H04L 25/0204; H04L 25/0216; H04L 25/0224; H04L 25/0232; H04L 25/0242; H04L 5/0016; H04L 5/003; H04L 5/0044; H04L 5/0053; H04L 5/0057; H04L 5/0064; H04L 2209/80; H04L 9/0875; H04L 9/3242; H04L 5/0023; H04W 72/23; H04W 64/003; H04W 64/00;

(Continued)

(56) References Cited

U.S. PATENT DOCUMENTS

| | | | |
|---|---|---|---|
| 9,516,621 B2* | 12/2016 | Bialer | ................... G01S 19/396 |
| 2019/0064315 A1* | 2/2019 | Ylamurto | .............. G01S 5/0205 |

(Continued)

FOREIGN PATENT DOCUMENTS

| | | | | |
|---|---|---|---|---|
| CN | 105933867 A | * | 9/2016 | ............ H04W 4/023 |

OTHER PUBLICATIONS

Extended European Search Report issued in corresponding European Application No. 20965418.5, dated Jun. 4, 2024, pp. 1-15.

*Primary Examiner* — Quan M Hua
(74) *Attorney, Agent, or Firm* — HAUPTMAN HAM, LLP

(57) ABSTRACT

A method for estimating a time of arrival based on non-contiguous spectrums includes receiving a plurality of signals from a transmit end on a plurality of frequency bands. The plurality of frequency bands are in a one-to-one correspondence with the plurality of signals. The method also includes determining, based on the plurality of signals, channel frequency responses (CFRs) of the frequency bands corresponding to the plurality of signals. The method further includes determining a CFR of a full bandwidth based on the CFRs of the frequency bands corresponding to the plurality of signals. The method additionally includes determining a time of arrival estimate based on the CFR of the full bandwidth. The time of arrival estimate is used to determine location information of a terminal device.

20 Claims, 15 Drawing Sheets

(58) Field of Classification Search
CPC ... H04W 4/029; H04W 56/001; H04W 72/04;
H04W 72/0446; H04W 72/0453; H04W
72/21; H04W 72/51; H04W 72/54; H04W
24/10
See application file for complete search history.

(56) References Cited

U.S. PATENT DOCUMENTS

2019/0253282  A1*   8/2019   Hadaschik ............ H04L 25/022
2019/0253906  A1*   8/2019   Lin ........................ H04W 24/10

* cited by examiner

BW1 BW2

Reference signal

Reference signal

Frequency domain $f_{c1}$ $f_{c2}$

METHOD FOR ESTIMATING TIME OF ARRIVAL BASED ON NON-CONTIGUOUS SPECTRUMS AND APPARATUS

CROSS-REFERENCE TO RELATED APPLICATIONS

This application is a continuation of International Application No. PCT/CN2020/136630, filed on Dec. 16, 2020, the disclosure of which is hereby incorporated by reference in its entirety.

TECHNICAL FIELD

This application relates to the field of communication technologies, and in particular, to a method for estimating a time of arrival based on non-contiguous spectrums and an apparatus.

BACKGROUND

A time of arrival (TOA) estimation technology is one of key technologies of cellular positioning. A terminal device may measure TOAs of downlink reference signals from different network devices, and send the TOAs to the network devices. Alternatively, the terminal device may send uplink reference signals to different network devices, and the different network devices measure TOAs of the uplink reference signals. Finally, location relationships between the terminal device and the different network devices can be obtained, so that a location of the terminal device can be positioned. Estimation accuracy of the TOA determines positioning accuracy of the terminal device, and the estimation accuracy of the TOA is limited by effective bandwidth of a reference signal. For example, single-carrier maximum bandwidth of a low frequency band FR1 in a fifth generation (5G) new radio (new radio, NR) frequency range (FR) is 100 MHz, and TOA estimation accuracy is limited.

A method for breaking through bandwidth limitation is non-contiguous spectrum transmission. To be specific, reference signals with fixed bandwidth are separately mapped to different frequency bands for transmission. However, how to improve a non-contiguous spectrum-based TOA estimation gain is a problem that needs to be resolved.

SUMMARY

This application provides a method for estimating a time of arrival based on non-contiguous spectrums, to improve a non-contiguous spectrum-based TOA estimation gain.

According to a first aspect, a method for estimating a time of arrival based on non-contiguous spectrums is provided. The method may be performed by a receive end. The receive end may be a terminal device, and a transmit end is a network device: or the receive end is a network device, and a transmit end is a terminal device. The method may be performed by the receive end, or may be performed by a component (for example, a processor, a chip, or a chip system) of the receive end. The method may be implemented by performing the following steps: receiving a plurality of signals from the transmit end on a plurality of frequency bands, where the plurality of frequency bands are in a one-to-one correspondence with the plurality of signals; determining, based on the plurality of signals, channel frequency responses CFRs of the frequency bands corresponding to the plurality of signals: determining a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end, where there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and determining a time of arrival estimate based on the CFR of the full bandwidth, where the time of arrival estimate is used to determine location information of the terminal device. The CFRs of the plurality of frequency bands are mapped to the CFR of the full bandwidth that has the same frequency domain range as the transmit end, so that a phase relationship of CFRs between different frequency bands is reconstructed, to implement coherent TOA estimation of the full bandwidth. The method can effectively avoid a frequency selective channel characteristic and sidelobe interference caused by non-contiguous spectrums, to achieve a full-bandwidth cross-frequency gain. In addition, the method can further reduce frequency domain resources occupied by a signal and improve spectral utilization efficiency of data transmission.

In a possible design, the determining, based on the plurality of signals, channel frequency responses CFRs of the frequency bands corresponding to the plurality of signals may be implemented by performing the following steps: determining a coarse delay estimate of the full bandwidth based on the plurality of signals: determining a filtering window based on the coarse delay estimate of the full bandwidth, and separately filtering, based on the filtering window, channel impulse responses of the frequency bands corresponding to the plurality of signals to obtain a plurality of filtered channel impulse responses; and separately performing frequency domain transformation on the plurality of filtered channel impulse responses to obtain the CFRs of the frequency bands corresponding to the plurality of signals. Temporal filtering is performed to effectively filter out a non line of sight (NLOS) and reduce impact of the NLOS on TOA estimation of a line of sight (LOS).

In a possible design, the determining a coarse delay estimate of the full bandwidth based on the plurality of signals may be implemented by performing the following steps: separately performing channel estimation on the plurality of signals to obtain the channel impulse responses of the frequency bands corresponding to the plurality of signals: separately performing coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determining the coarse delay estimate of the full bandwidth based on the plurality of coarse delay estimates. Coarse channel delay values of the plurality of frequency bands are independently estimated, so that a channel diversity gain can be obtained, and robustness of coarse delay estimation is improved.

In a possible design, the coarse delay estimate of the full bandwidth is a coarse delay estimate corresponding to one of the plurality of frequency bands: or the coarse delay estimate of the full bandwidth is a value obtained by performing weighted combining on some or all of the coarse delay estimates corresponding to the plurality of frequency bands. Independent coarse delay estimation and selection combining are performed for a plurality of frequency bands, so that a coarse delay estimate with a relatively large error can be effectively ruled out. Weighted combining is performed on similar coarse delay estimates, so that accuracy of coarse estimation can be further improved.

In a possible design, the determining a time of arrival estimate based on the CFR of the full bandwidth may be implemented by performing the following steps: dividing the CFR of the full bandwidth to obtain a plurality of subsequences, where each of the plurality of subsequences includes a partial CFR of each of the plurality of frequency bands; and determining the time of arrival estimate based on the plurality of subsequences. A sequence of the CFR of the full bandwidth is divided, and the subsequences can cover all frequency bands, so that burst interference can be effectively avoided, and impact of burst degraded data on an estimation result can be avoided.

In a possible design, the determining the time of arrival estimate based on the plurality of subsequences may be implemented by performing the following steps: determining an autocorrelation matrix corresponding to each of the plurality of subsequences to obtain a plurality of autocorrelation matrices corresponding to the plurality of subsequences: determining, based on the plurality of autocorrelation matrices, a delay corresponding to a peak point of a channel delay pseudospectrum; and determining the time of arrival estimate based on the delay.

In a possible design, compensation is performed for a random phase difference between a value of the CFR of the full bandwidth on a first frequency band and a value of the CFR of the full bandwidth on a second frequency band based on phase correction values of the first frequency band and the second frequency band. Phase compensation is performed to avoid impact of an inherent phase difference between different radio frequency links on TOA estimation.

According to a second aspect, an apparatus is provided. The apparatus may be a terminal device, or may be an apparatus (for example, a chip, a chip system, or a circuit) in a terminal device, or may be an apparatus that can be used together with a terminal device. In a design, the apparatus may include modules that are in a one-to-one correspondence with the methods/operations/steps/actions described in the first aspect. The module may be implemented by a hardware circuit, software, or a combination of a hardware circuit and software. In a design, the apparatus may include a processing module and a communication module. The processing module is configured to invoke the communication module to perform a receiving function and/or a sending function. The processing module may be further divided into a first processing module and a second processing module. An example is as follows:

The communication module is configured to receive a plurality of signals from a transmit end on a plurality of frequency bands. The plurality of frequency bands are in a one-to-one correspondence with the plurality of signals. The first processing module is configured to: determine, based on the plurality of signals, channel frequency responses CFRs of the frequency bands corresponding to the plurality of signals; and determine a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end. There is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero. The second processing module is configured to determine a time of arrival estimate based on the CFR of the full bandwidth. The time of arrival estimate is used to determine location information of the terminal device.

In a possible design, when determining, based on the plurality of signals, the channel frequency responses CFRs of the frequency bands corresponding to the plurality of signals, the first processing module is configured to: determine a coarse delay estimate of the full bandwidth based on the plurality of signals: determine a filtering window based on the coarse delay estimate of the full bandwidth, and separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

In a possible design, when determining the coarse delay estimate of the full bandwidth based on the plurality of signals, the first processing module is configured to: separately perform channel estimation on the plurality of signals to obtain the channel impulse responses of the frequency bands corresponding to the plurality of signals: separately perform coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

In a possible design, the coarse delay estimate of the full bandwidth is a coarse delay estimate corresponding to one of the plurality of frequency bands: or the coarse delay estimate of the full bandwidth is a value obtained by performing weighted combining on some or all of the coarse delay estimates corresponding to the plurality of frequency bands.

In a possible design, when determining the time of arrival estimate based on the CFR of the full bandwidth, the second processing module is configured to: divide the CFR of the full bandwidth to obtain a plurality of subsequences, where each of the plurality of subsequences includes a partial CFR of each of the plurality of frequency bands; and determine the time of arrival estimate based on the plurality of subsequences.

In a possible design, when determining the time of arrival estimate based on the plurality of subsequences, the second processing module is configured to: determine an autocorrelation matrix corresponding to each of the plurality of subsequences to obtain a plurality of autocorrelation matrices corresponding to the plurality of subsequences: determine, based on the plurality of autocorrelation matrices, a delay corresponding to a peak point of a channel delay pseudospectrum; and determine the time of arrival estimate based on the delay.

According to a third aspect, an embodiment of this application provides a communication apparatus. The communication apparatus includes a communication interface and a processor, and the communication interface is used by the apparatus to communicate with another device, for example, to receive/transmit data or a signal. For example, the communication interface may be a transceiver, a circuit, a bus, a module, or another type of communication interface, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor, and when the processor executes the instructions or the data stored in the memory, the method described in the first aspect may be implemented.

The communication interface is configured to receive a plurality of signals from a transmit end on a plurality of frequency bands. The plurality of frequency bands are in a one-to-one correspondence with the plurality of signals. The processor is configured to implement the following operations: determining, based on the plurality of signals, channel frequency responses CFRs of the frequency bands corresponding to the plurality of signals: determining a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end, where there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and determining a time of arrival estimate based on the CFR of the full bandwidth, where the time of arrival estimate is used to determine location information of a terminal device.

In a possible design, when determining, based on the plurality of signals, the channel frequency responses CFRs of the frequency bands corresponding to the plurality of signals, the processor is configured to: determine a coarse delay estimate of the full bandwidth based on the plurality of signals: determine a filtering window based on the coarse delay estimate of the full bandwidth, and separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

In a possible design, when determining the coarse delay estimate of the full bandwidth based on the plurality of signals, the processor is configured to: separately perform channel estimation on the plurality of signals to obtain the channel impulse responses of the frequency bands corresponding to the plurality of signals; separately perform coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

In a possible design, the coarse delay estimate of the full bandwidth is a coarse delay estimate corresponding to one of the plurality of frequency bands; or the coarse delay estimate of the full bandwidth is a value obtained by performing weighted combining on some or all of the coarse delay estimates corresponding to the plurality of frequency bands.

In a possible design, when determining the time of arrival estimate based on the CFR of the full bandwidth, the processor is configured to: divide the CFR of the full bandwidth to obtain a plurality of subsequences, where each of the plurality of subsequences includes a partial CFR of each of the plurality of frequency bands; and determine the time of arrival estimate based on the plurality of subsequences.

In a possible design, when determining the time of arrival estimate based on the plurality of subsequences, the processor is configured to: determine an autocorrelation matrix corresponding to each of the plurality of subsequences to obtain a plurality of autocorrelation matrices corresponding to the plurality of subsequences; determine, based on the plurality of autocorrelation matrices, a delay corresponding to a peak point of a channel delay pseudospectrum; and determine the time of arrival estimate based on the delay.

According to a fourth aspect, an embodiment of this application further provides a computer-readable storage medium. The computer-readable storage medium stores computer-readable instructions, and when the computer-readable instructions run on a computer, the method according to any one of the first aspect and the possible designs of the first aspect is performed.

According to a fifth aspect, an embodiment of this application provides a chip system. The chip system includes a processor, may further include a memory, and is configured to implement the method according to any one of the first aspect and the possible designs of the first aspect. The chip system may include a chip, or may include a chip and another discrete component.

According to a sixth aspect, an embodiment of this application provides a system. The system includes a transmit end and a receive end, and the receive end is configured to perform the method according to any one of the first aspect and the possible designs of the first aspect.

According to a seventh aspect, a computer program product including instructions is provided. When the computer program product runs on a computer, the method according to any one of the first aspect and the possible designs of the first aspect is implemented.

For beneficial effects of the second aspect to the seventh aspect, refer to the descriptions of the first aspect. Details are not described herein again.

DESCRIPTION OF EMBODIMENTS

Embodiments of this application provide a method for estimating a time of arrival based on non-contiguous spectrums and an apparatus. The method and the apparatus are based on a same technical concept. The method and the apparatus have similar principles for resolving the problems. Therefore, for implementation of the apparatus and the method, refer to each other. Details of repeated parts are not described. In the descriptions of embodiments of this application, "and/or" describes an association relationship between associated objects, and represents that three relationships may exist. For example, A and/or B may represent the following three cases: Only A exists, both A and B exist, and only B exists. The character "/" generally indicates an "or" relationship between the associated objects. "At least one" in this application means one or more. "A plurality of" means two or more. In addition, it should be understood that, in the descriptions of this application, terms "first" and "second" are only used for the purpose of description distinguishing, but cannot be understood as an indication or an implication of relative importance, and cannot be understood as an indication or an implication of an order.

The method for estimating a time of arrival based on non-contiguous spectrums provided in embodiments of this application may be applied to a 4th generation (4G) communication system, for example, a long term evolution (LTE) communication system, or may be applied to a 5th generation (5G) communication system, for example, a 5G new radio (NR) communication system, or may be applied to various future communication systems, for example, a 6th generation (6G) communication system. The method provided in embodiments of this application may be further applied to a Bluetooth system, a Wi-Fi system, a LoRa system, or an internet of vehicles system. The method provided in embodiments of this application may be further applied to a satellite communication system. The satellite communication system may be integrated with the foregoing communication system.

Figures 1, 2:
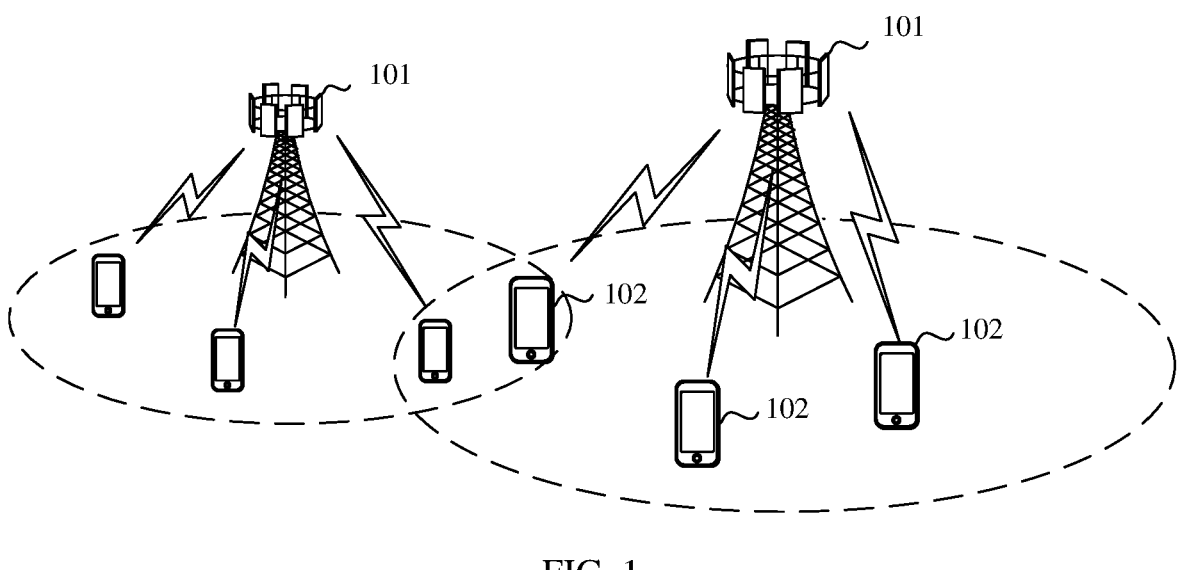
FIG. 1 is a schematic diagram of an architecture of a communication system according to an embodiment of this application.
FIG. 2 is a schematic diagram 1 of non-contiguous spectrum transmission according to an embodiment of this application.

For ease of understanding of embodiments of this application, an application scenario used in this application is described by using a communication system architecture shown in FIG. 1 as an example. As shown in FIG. 1, a communication system 100 includes a network device 101 and a terminal device 102. The apparatus provided in this embodiment of this application may be applied to the network device 101 or the terminal device 102. It may be understood that FIG. 1 shows only one possible communication system architecture to which embodiments of this application may be applied. In another possible scenario, the communication system architecture may alternatively include another device.

The network device 101 is a node in a radio access network (RAN), and may also be referred to as a base station, or may be referred to as a RAN node (or device). Currently, some examples of the network device 101 are a next generation NodeB (next generation NodeB, gNB)/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), a satellite device, a network device in a 5G communication system, or a network device in a possible future communication system. Alternatively, the network device 101 may be another device that has a network device function. For example, the network device 101 may alternatively be a device that functions as a network device in device to device (D2D) communication, internet of vehicles communication, or machine-to-machine communication. Alternatively, the network device 101 may be a network device in a possible future communication system.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling, for example, RRC layer signaling or PHCP layer signaling, may also be considered as being sent by the DU, or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device 102 may also be referred to as user equipment (UE), a mobile station (mobile station, MS), a mobile terminal (MT), or the like, and is a device that provides voice or data connectivity for a user. The terminal device may alternatively be an internet of things device. For example, the terminal device includes a handheld device or a vehicle-mounted device that has a wireless connection function. Currently, the terminal device may be a mobile phone, a tablet computer, a laptop computer, a palmtop computer, a mobile internet device (MID), a wearable device (for example, a smartwatch, a smart band, or a pedometer), a vehicle-mounted device (for example, a car, a bicycle, an electric car, an airplane, a ship, a train, or a high-speed rail), a virtual reality (VR) device, an augmented reality (AR) device, a wireless terminal in industrial control, a smart household device (for example, a refrigerator, a television, an air conditioner, or a meter), an intelligent robot, workshop equipment, a wireless terminal in self driving, a wireless terminal in remote surgery, a wireless terminal in a smart grid, a wireless terminal in transportation safety, a wireless terminal in a smart city, a wireless terminal in a smart home, a flight device (for example, an intelligent robot, a hot air balloon, a drone, or an airplane). Alternatively, the terminal device may be another device that has a terminal function. For example, the terminal device may alternatively be a device that functions as a terminal in D2D communication. In this application, a terminal device that has a wireless transceiver function and a chip that can be disposed in the foregoing terminal device are collectively referred to as a terminal device.

Non-contiguous spectrums mean two or more non-contiguous spectrums or two or more non-contiguous frequency bands. Non-contiguous spectrum transmission means transmitting reference signals on two or more non-contiguous spectrums. In other words, non-contiguous spectrum transmission means transmission on two or more frequency bands. A plurality of spectrums may be described as a plurality of frequency bands. For example, one spectrum may be described as one frequency band, and two spectrums may be described as two frequency bands.

Non-contiguous spectrum transmission may also be referred to as cross-frequency transmission or multi-band transmission. As shown in FIG. 2, taking two non-contiguous spectrums as an example, a transmit end separately maps reference signals to two spectrums for sending. When the transmit end may be a network device, the reference signal is a downlink reference signal, and a receive end is a terminal device. When the transmit end is a terminal device, the reference signal is an uplink reference signal, and a receive end is a network device. Center frequencies of the two spectrums are $f_{c1}$ and $f_{c2}$. Bandwidth of the two spectrums is BW1 and BW2.

In non-contiguous spectrum transmission in embodiments of this application, a reference signal may be transmitted on a carrier frequency of a non-serving cell. For example, a carrier frequency resource pool includes a plurality of carrier frequencies, the network device supports some carrier frequencies, and when transmitting a reference signal used for positioning, the network device may transmit the reference signal on a carrier frequency supported by the network device, or may transmit the reference signal on a carrier frequency not supported by the network device. This is different from a carrier aggregation technology.

In Implementation 1, TOA estimation in a non-contiguous spectrum transmission scenario is performed by using a method based on maximum likelihood estimation (MLE). Formula (1) and Formula (2) are used to implement TOA estimation.

$$R_{rs}(\tilde{\tau}) = \frac{1}{L}\sum_{l=0}^{L-1}\left(\frac{1}{N}\sum_{n=0}^{N-1}r_l[n]s_l^*[n,\tilde{\tau}]\right) \qquad \text{Formula (1)}$$

$r_l[n]$ represents a received reference signal time domain sequence of the $l^{th}$ frequency band, $s_l[n, \tilde{\tau}]$ represents a locally generated sequence after a delay $\tilde{\tau}$ is added to the reference signal time domain sequence of the $l^{th}$ frequency band, * represents a conjugate operation, N represents a length of each reference subsequence, and L represents a quantity of frequency bands.

A TOA estimate can be represented as follows:

$$\hat{\tau} = \underset{\tilde{\tau}}{\arg\max}\{|R_{rs}(\tilde{\tau})|\} \qquad \text{Formula (2)}$$

The method in Implementation 1 can implement TOA estimation in the non-contiguous spectrum transmission scenario, but only a limited TOA estimation gain can be achieved compared with contiguous-spectrum single-band transmission. A theoretical analysis result shows that TOA estimation accuracy in the non-contiguous spectrum transmission scenario is proportional to the square of a ratio of a frequency band spacing to signal bandwidth. In the method, TOA estimation in the non-contiguous spectrum transmission scenario is implemented through sum and average, and only a diversity gain of multi-band transmission can be achieved, but effective bandwidth of a signal cannot be increased, and therefore a cross-frequency gain of full bandwidth cannot be achieved.

Based on this, embodiments of this application provide a method for estimating a time of arrival based on non-contiguous spectrums, to implement a cross-frequency gain of full bandwidth in a non-contiguous spectrum scenario.

The method for estimating a TOA based on non-contiguous spectrums provided in embodiments of this application may be used in a positioning technology. For better understanding of the method provided in embodiments of this application, the positioning technology is first described.

Figure 3:
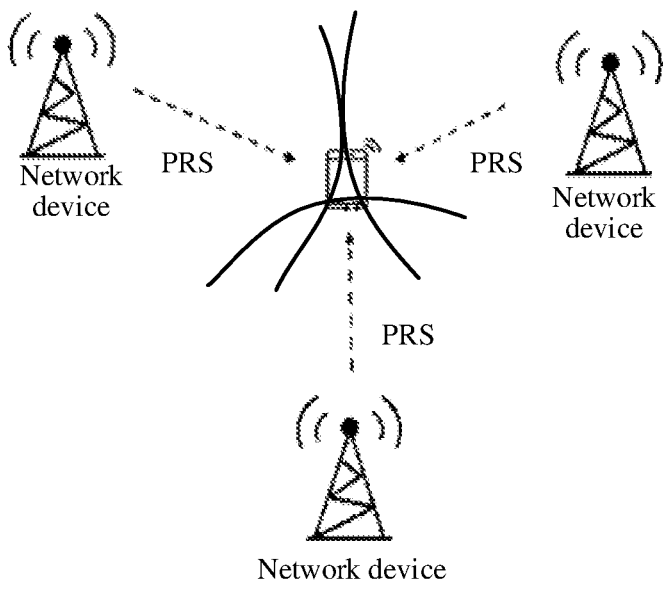
FIG. 3 is a schematic diagram of positioning according to an embodiment of this application.

5G NR defines a plurality of positioning methods based on TOA estimation, for example, an observed time difference of arrival (OTDOA), a multi-round trip time (Multi-RTT), a downlink time difference of arrival (DL-TDOA), and an uplink time difference of arrival (-TDOA). In the positioning method based on TOA estimation, a location of a terminal device is positioned by using a TOA estimate. The following uses DL-TDOA positioning as an example to describe the positioning method based on TOA estimation. The positioning method based on TOA estimation includes: A terminal device determines location information of the terminal device, and a core network positioning device determines the location information of the terminal device. As shown in FIG. 3, the core network positioning device sends signaling to a plurality of network devices to request TOA information of the terminal device. The plurality of network devices separately send downlink positioning reference signals (PRS) to the terminal device. The terminal device measures the TOA information based on configuration information, and feeds back the TOA information to the plurality of network devices. The network device reports the received TOA information from the terminal device to the core network positioning device. The core network positioning device calculates a TDOA based on the TOA information between the plurality of network devices and the terminal device, and obtains the location information of the terminal device based on known location information of the network devices. Assuming that the terminal device has a positioning capability, the terminal device may request location information, and position location information of the terminal device. The terminal device requests location information from the network device. A plurality of network devices separately send downlink positioning reference signals (PRS) to the terminal device. The terminal device separately measures TOAs of the plurality of network devices based on the downlink PRSs. The terminal device can determine the location information of the terminal device based on known locations of the network devices; or the terminal device reports TOA information of the network devices to the core network positioning device, and the core network positioning device determines the location information of the terminal device.

In this embodiment of this application, the core network positioning device may be, for example, a location management function (LMF) in an NR system. For example, in a possible positioning architecture, an access and mobility management function (AMF) receives a service request about a terminal device that is initiated by another network element in a network, the AMF sends the positioning request about the terminal device to the LMF, and the LMF receives the positioning request from the AMF, initiates positioning of the terminal device, and determines location information of the terminal device.

Figure 4:
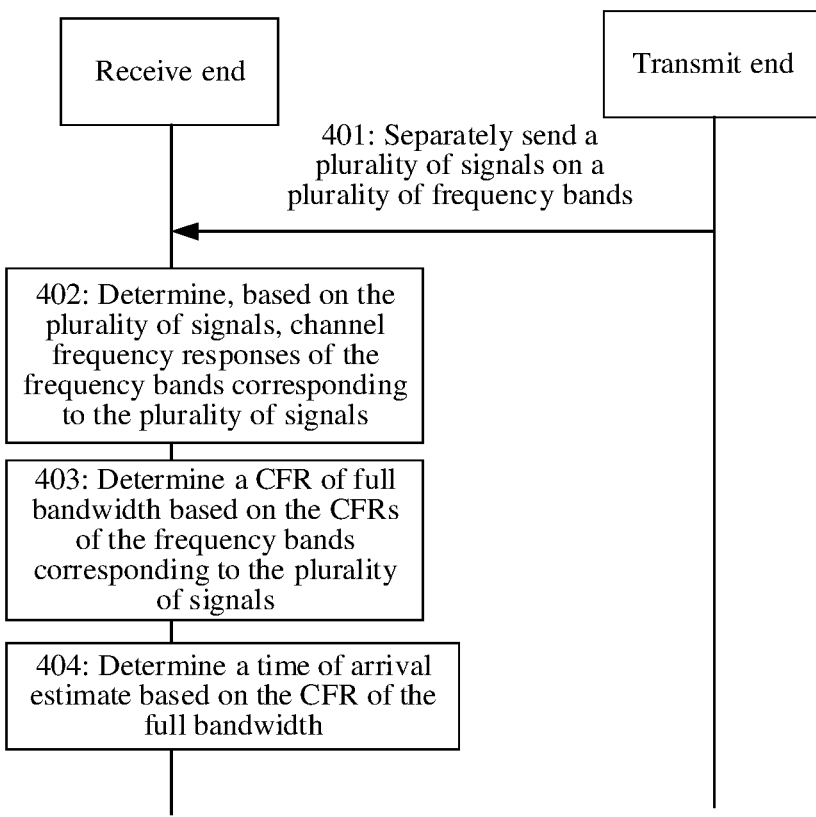
FIG. 4 is a schematic flowchart 1 of a method for estimating a time of arrival based on non-contiguous spectrums according to an embodiment of this application.

Based on the foregoing descriptions, as shown in FIG. 4, a procedure of a method for estimating a time of arrival based on non-contiguous spectrums provided in embodiments of this application is described as follows. The method is performed by a receive end, and the receive end may be a terminal device or a network device. When the receive end is a terminal device, a transmit end is a network device. When the receive end is a network device, a transmit end is a terminal device.

S401: The transmit end separately sends a plurality of signals on a plurality of frequency bands, and the receive end receives the plurality of signals from the transmit end on the plurality of frequency bands. The plurality of frequency bands are in a one-to-one correspondence with the plurality of signals.

For example, the plurality of frequency bands are two frequency bands, including a first frequency band and a second frequency band. The transmit end sends a first signal on the first frequency band, and sends a second signal on the second frequency band. The receive end receives the first signal on the first frequency band, and receives the second signal on the second frequency band.

For another example, the plurality of frequency bands are three frequency bands, including a first frequency band, a second frequency band, and a third frequency band. The transmit end sends a first signal on the first frequency band, sends a second signal on the second frequency band, and sends a third signal on the third frequency band. The receive end receives the first signal on the first frequency band, receives the second signal on the second frequency band, and receives the third signal on the third frequency band.

In this embodiment of this application, the signal may be a reference signal used for positioning. For example, the signal may be a downlink PRS, or may be an uplink sounding reference signal (SRS).

S402: The receive end determines, based on the plurality of signals, channel frequency responses CFRs of the frequency bands corresponding to the plurality of signals.

For example, the plurality of frequency bands are two frequency bands, and the receive end determines, based on the first signal, a first CFR of the first frequency band corresponding to the first signal, and determines, based on the second signal, a second CFR of the second frequency band corresponding to the second signal.

For example, the plurality of frequency bands are three frequency bands, and the receive end determines, based on the first signal, a first CFR of the first frequency band corresponding to the first signal, determines, based on the second signal, a second CFR of the second frequency band corresponding to the second signal, and determines, based on the third signal, a third CFR of the third frequency band corresponding to the third signal.

S403: The receive end determines a CFR of full bandwidth based on the CFRs of the frequency bands corresponding to the plurality of signals.

The full bandwidth includes the plurality of frequency bands, and a frequency domain range of the full bandwidth is the same as a frequency domain range of the plurality of signals at the transmit end. There is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero.

S404: The receive end determines a time of arrival estimate based on the CFR of the full bandwidth, where the time of arrival estimate is used to determine location information of the terminal device.

In the embodiment of FIG. 4, the CFRs of the plurality of frequency bands are mapped to the CFR of the full bandwidth that has the same frequency domain range as the transmit end, so that a phase relationship of CFRs between different frequency bands is reconstructed, to implement coherent TOA estimation of the full bandwidth. The method can effectively avoid a frequency selective channel characteristic and sidelobe interference caused by non-contiguous spectrums, to achieve a full-bandwidth cross-frequency gain.

The following describes some possible implementations of the embodiment of FIG. 4.

The full bandwidth is first described.

Figure 5A:
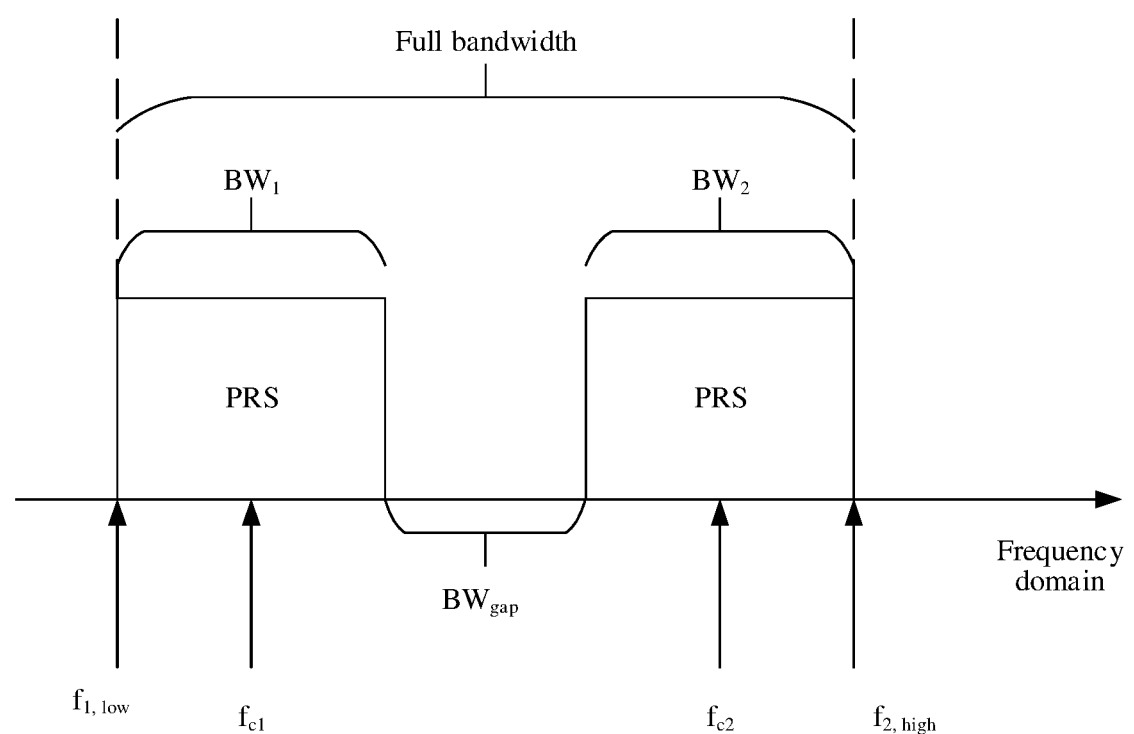
FIG. 5a is a schematic diagram 2 of non-contiguous spectrum transmission according to an embodiment of this application.

Taking non-contiguous spectrums of two frequency bands as an example, as shown in FIG. 5*a*, the transmit end separately sends reference signals on the first frequency band and the second frequency band, and the reference signal is a PRS, for example. Bandwidth of the first frequency band is represented by BW1, and bandwidth of the second frequency band is represented by BW2. There is a gap frequency band between the first frequency band and the second frequency band, and the gap frequency band is represented by $BW_{gap}$. The transmit end sends no PRS on the gap frequency band. A center frequency of the first frequency band is represented by $f_{c1}$, and a center frequency of the second frequency band is represented by $f_{c2}$. A start frequency domain position or a start frequency domain point of the first frequency band is represented by $f_{1,\,low}$, and an end frequency domain position or an end frequency domain point of the second frequency band is represented by $f_{2,\,high}$. In other words, $f_{1,\,low}$ is a lowest frequency of a reference signal whose center frequency is $f_{c1}$, and $f_{2,\,high}$ is a highest frequency of a reference signal whose center frequency is $f_{c2}$. The full bandwidth includes the first frequency band and the second frequency band. A start frequency domain position or a start frequency domain point of the full bandwidth is $f_{1,\ low}$, and an end frequency domain position or an end frequency domain position of the full bandwidth is $f_{2,\ high}$. A frequency domain range of the full bandwidth is $f_{1,\ low}$ to $f_{2,\ high}$. The full bandwidth may be defined as $f_{2,\ high}$–$f_{1,\ low}$.

Figure 5B:
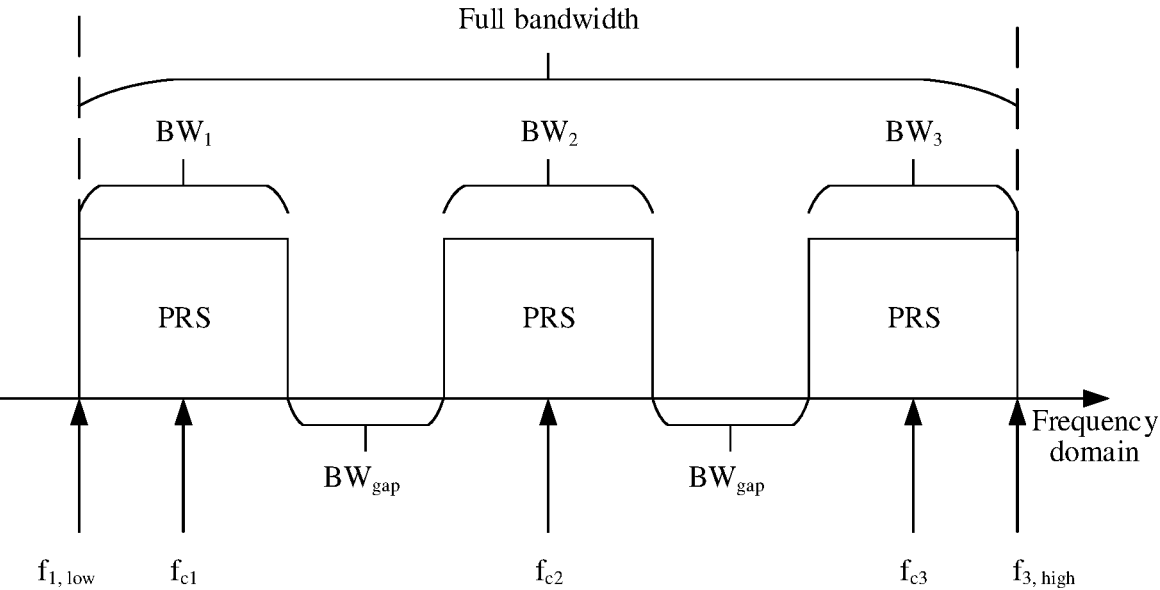
FIG. 5b is a schematic diagram 3 of non-contiguous spectrum transmission according to an embodiment of this application.

Taking non-contiguous spectrums of three frequency bands as an example, as shown in FIG. 5b, the transmit end separately sends reference signals on the first frequency band, the second frequency band, and the third frequency band, and the reference signal is a PRS, for example. Bandwidth of the first frequency band is represented by BW1, bandwidth of the second frequency band is represented by BW2, and bandwidth of the third frequency band is represented by BW3. There is a gap frequency band between the first frequency band and the second frequency band, and there is a gap frequency band between the second frequency band and the third frequency band. The gap frequency band is represented by $BW_{gap}$. The transmit end sends no PRS on the gap frequency band. A center frequency of the first frequency band is represented by $f_{c1}$, a center frequency of the second frequency band is represented by $f_{c2}$, and a center frequency of the third frequency band is represented by $f_{c3}$. A start frequency domain position or a start frequency domain point of the first frequency band is represented by $f_{1,\ low}$, and an end frequency domain position or an end frequency domain point of the third frequency band is represented by $f_{3,\ high}$. In other words, $f_{1,\ low}$ is a lowest frequency of a reference signal whose center frequency is $f_{c1}$, and $f_{3,\ high}$ is a highest frequency of a reference signal whose center frequency is $f_{c3}$. The full bandwidth includes the first frequency band, the second frequency band, and the third frequency band. A start frequency domain position or a start frequency domain point of the full bandwidth is $f_{1,\ low}$, and an end frequency domain position or an end frequency domain position of the full bandwidth is $f_{3,\ high}$. A frequency domain range of the full bandwidth is $f_{1,\ low}$ to $f_{3,\ high}$. The full bandwidth may be defined as $f_{3,\ high}$–$f_{1,\ low}$.

When the receive end is the terminal device, the terminal device determines, based on configuration information of a core network positioning device, a plurality of frequency bands on which the network device sends signals. The core network positioning device may be, for example, an LMF. The terminal device receives the signals on the plurality of frequency bands based on the configuration information.

When the receive end is the network device, before the network device receives signals, the LMF sends configuration information to a plurality of network devices. The configuration information includes a configuration of sending an uplink reference signal (for example, an SRS) by the terminal device. The network device receives the signals on a plurality of frequency bands based on the received configuration information from the LMF.

The receive end separately receives a plurality of signals through a plurality of independent radio frequency channels. For example, taking non-contiguous spectrums of two frequency bands as an example, the transmit end respectively sends the first signal and the second signal on the first frequency band and the second frequency band, and the receive end separately receives the first signal and the second signal through two independent radio frequency channels. For another example, taking non-contiguous spectrums of three frequency bands as an example, the transmit end respectively sends the first signal, the second signal, and the third signal on the first frequency band, the second frequency band, and the third frequency band, and the receive end separately receives the first signal, the second signal, and the third signal through three independent radio frequency channels.

In S402, the receive end may determine, in the following manner, the CFRs of the frequency bands corresponding to the plurality of signals.

(1) A coarse delay estimate of the full bandwidth is determined based on the plurality of signals.

The coarse delay estimate of the full bandwidth may be determined in the following method: separately performing channel estimation on the plurality of signals to obtain channel impulse responses (CIR) of the frequency bands corresponding to the plurality of signals; separately performing coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determining the coarse delay estimate of the full bandwidth based on the plurality of coarse delay estimates.

The plurality of signals received by the receive end are baseband signals, and the receive end separately performs signal estimation on the plurality of received baseband signals. A channel estimation method may be any method. This is not limited in this embodiment of this application. The receive end obtains the channel impulse responses of the plurality of frequency bands corresponding to the plurality of baseband signals. The receive end separately performs coarse delay estimation on the channel impulse responses based on the frequency bands corresponding to the plurality of signals. Coarse delay estimation may be performed by using a peak search method. The receive end may determine the coarse delay estimate of the full bandwidth based on the plurality of coarse delay estimates. A selection combining method or a weighted combining method may be used. For example, the receive end determines a coarse delay estimate corresponding to one of the plurality of frequency bands as the coarse delay estimate of the full bandwidth by using the selection combining method. For example, taking non-contiguous spectrums of two frequency bands as an example, the coarse delay estimate of the full bandwidth may be a coarse delay estimate corresponding to the first frequency band, or may be a coarse delay estimate corresponding to the second frequency band. Taking non-contiguous spectrums of three frequency bands as an example, the coarse delay estimate of the full bandwidth may be a coarse delay estimate corresponding to the first frequency band, or may be a coarse delay estimate corresponding to the second frequency band, or may be a coarse delay estimate corresponding to the third frequency band. The receive end performs, by using the weighted combining method, weighted combining based on the coarse delay estimates corresponding to the plurality of frequency bands to obtain the coarse delay estimate of the full bandwidth. In some embodiments, the coarse delay estimates corresponding to the frequency bands are multiplied by weighting factors, and products of the coarse delay estimates corresponding to the frequency bands and the weighting factors are added to obtain the coarse delay estimate of the full bandwidth. Certainly, weighted combining may be performed based on some of the coarse delay estimates corresponding to the plurality of frequency bands to obtain the coarse delay estimate of the full bandwidth. Still taking non-contiguous spectrums of two frequency bands as an example, the coarse delay estimate of the full bandwidth is a value obtained by performing weighted combining on a coarse delay estimate corresponding to the first frequency band and a coarse delay estimate corresponding to the second frequency band. Taking non-contiguous spectrums of three frequency bands as an example, the coarse delay estimate of the full bandwidth is a value obtained by performing weighted combining on a coarse delay estimate corresponding to the first frequency band, a coarse delay estimate corresponding to the second frequency band, and a coarse delay estimate corresponding to the third frequency band: or the coarse delay estimate of the full bandwidth may alternatively be a value obtained by performing weighted combining on a coarse delay estimate corresponding to the first frequency band and a coarse delay estimate corresponding to the second frequency band: or the coarse delay estimate of the full bandwidth may alternatively be a value obtained by performing weighted combining on a coarse delay estimate corresponding to the first frequency band and a coarse delay estimate corresponding to the third frequency band: or the coarse delay estimate of the full bandwidth may alternatively be a value obtained by performing weighted combining on a coarse delay estimate corresponding to the second frequency band and a coarse delay estimate corresponding to the third frequency band.

(2) A filtering window is determined based on the coarse delay estimate of the full bandwidth, and the channel impulse responses of the frequency bands corresponding to the plurality of signals is separately filtered based on the filtering window to obtain a plurality of filtered channel impulse responses.

The filtering window is [coarse delay estimate of the full bandwidth-offset, coarse delay estimate of the full bandwidth+offset]. The offset is half of the filtering window. Corresponding values may be selected as the offset based on different cases and different systems.

(3) Frequency domain transformation is separately performed on the plurality of filtered channel impulse responses to obtain the channel frequency responses CFRs of the frequency bands corresponding to the plurality of signals.

All of the CFRs of the frequency bands corresponding to the plurality of signals are baseband signals whose center frequencies are zero. The receive end determines the CFR of the full bandwidth based on the CFRs of the frequency bands corresponding to the plurality of signals. The receive end maps the CFRs of the frequency bands corresponding to the plurality of signals to locations of corresponding virtual frequency bands in full baseband bandwidth. After the plurality of signals sent by the transmit end are received by the receive end, the receive end processes the plurality of signals to obtain a full-bandwidth baseband signal whose center frequency is zero. The full baseband bandwidth is full bandwidth of baseband signals.

A frequency domain range of the full baseband bandwidth is briefly described as the frequency domain range of the full bandwidth, and the frequency domain range of the full bandwidth is the same as the frequency domain range of the plurality of signals at the transmit end. The full bandwidth includes the plurality of frequency bands corresponding to the plurality of signals, and there is a gap frequency band between every two adjacent frequency bands in the plurality of frequency bands. The receive end maps the CFRs corresponding to the plurality of frequency bands to the plurality of frequency bands of the full bandwidth, and sets a value of the gap frequency band to zero.

Taking two frequency bands as an example, the frequency domain range of the full bandwidth is a lowest frequency of the first frequency band to a highest frequency of the second frequency band, and the full bandwidth sequentially includes the first frequency band, a gap frequency band between the first frequency band and the second frequency band, and the second frequency band in ascending order of frequency domains. A value of the CFR of the full bandwidth on the first frequency band is a value of a CFR corresponding to the first frequency band, a value of the CFR of the full bandwidth on the gap frequency band is zero, and a value of the CFR of the full bandwidth on the second frequency band is a value of a CFR corresponding to the second frequency band.

Taking three frequency bands as an example, the frequency domain range of the full bandwidth is a lowest frequency of the first frequency band to a highest frequency of the third frequency band, and the full bandwidth sequentially includes the first frequency band, a first gap frequency band between the first frequency band and the second frequency band, the second frequency band, a second gap frequency band between the second frequency band and the third frequency band, and the third frequency band in ascending order of frequency domains. A value of the CFR of the full bandwidth on the first frequency band is a value of a CFR corresponding to the first frequency band, a value of the CFR of the full bandwidth on the first gap frequency band is zero, a value of the CFR of the full bandwidth on the second frequency band is a value of a CFR corresponding to the second frequency band, a value of the CFR of the full bandwidth on the second gap frequency band is zero, and a value of the CFR of the full bandwidth on the third frequency band is a value of a CFR corresponding to the third frequency band.

The following uses an example in which there are two frequency bands and the receive end is the terminal to further describe in detail a process of determining the CFR of the full bandwidth.

The network device separately sends positioning reference signals PRSs on the first frequency band and the second frequency band, and the terminal device separately receives the positioning reference signals PRSs on the first frequency band and the second frequency band. Transmission of the PRSs is shown in FIG. 5a. The PRSs are separately sent on frequency bands B1 and B2 whose center frequencies are $f_{c1}$ and $f_{c2}$ and whose bandwidth is BW1 and BW2. The full bandwidth is defined as $Full\_BW=f_{2,high}-f_{1,low}$. $f_{1,low}$ represents a lowest frequency of a PRS whose center frequency is $f_{c1}$. $f_{2,high}$ represents a highest frequency of a PRS whose center frequency is $f_{c2}$.

The terminal device determines the CFRs of the first frequency band and the second frequency band based on the two signals received on the first frequency band and the second frequency band. The terminal device may learn, based on the configuration information of the LMF, that the network device sends PRSs of two frequency bands at the frequencies $f_{c1}$ and $f_{c2}$. The terminal device separately receives the PRSs through two independent radio frequency channels. The received PRS baseband signals are separately represented by $y_1(t)$ and $y_2(t)$. The terminal device separately performs channel estimation based on $y_1(t)$ and $y_2(t)$ to obtain channel impulse responses $h_1(t)$ and $h_2(t)$ of the first frequency band and the second frequency band. The terminal device separately performs coarse delay estimation based on $h_1(t)$ and $h_2(t)$ to obtain coarse delay estimates T1 and T2. The peak search method may be used for coarse delay estimation. In other words, $$T_1 = \operatorname*{argmax}_t \{|h_1(t)|\} \text{ and } T_2 = \operatorname*{argmax}_t \{|h_2(t)|\}.$$

Figure 6:
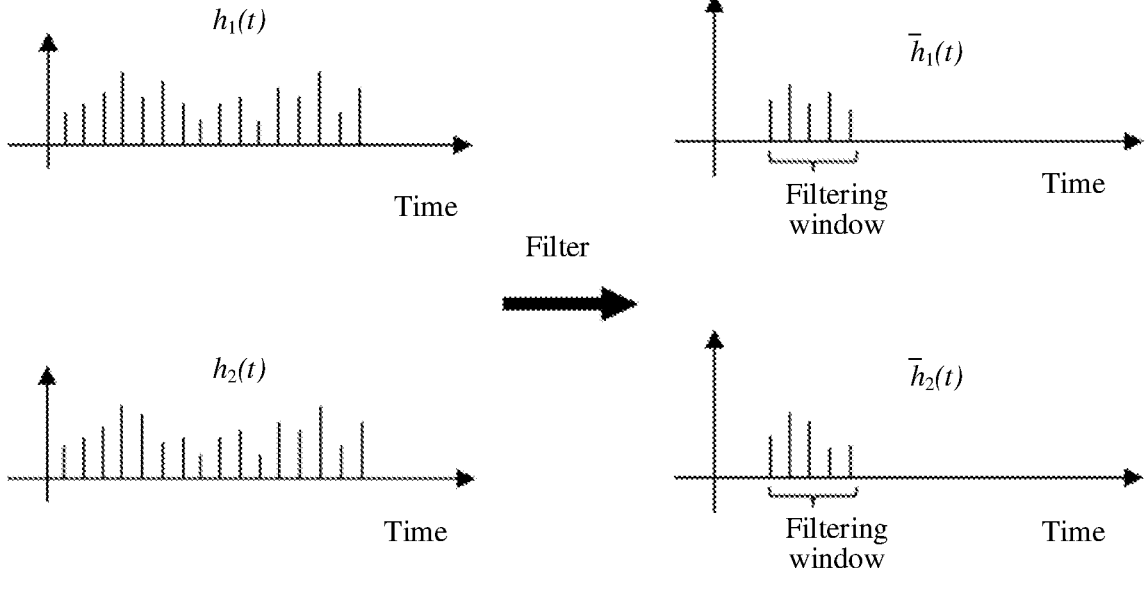
FIG. 6 is a schematic diagram 1 of filtering a channel impulse response according to an embodiment of this application.

The terminal device obtains the coarse delay estimate $T_{cor}$ of the full bandwidth (Full_BW) through combination based on the coarse delay values T1 and T2. The selection combining method may be used, and $T_{cor}$ is T1 or T2. The weighted combining method may alternatively be used, for example, $T_{cor}=T_1*C_1+T_2*C_2$. $C_1$ and $C_2$ are weighting factors of $T_1$ and $T_2$ respectively. As shown in FIG. 6, the terminal device filters $h_1(t)$ and $h_2(t)$ to obtain filtered channel impulse responses $\bar{h}_1(t)$ and $\bar{h}_2(t)$ respectively. The filtering window used for filtering is set based on $T_{cor}$. For example, the filtering window is Window=$[T_{cor}-D_{ext}, T_{cor}+D_{ext}]$, and $D_{ext}$ represents half of the filtering window. As shown in FIG. 6, the channel impulse response reflects a channel estimation result, amplitude represents a channel attenuation value, and an interval between two horizontal coordinate points is absolute time, and is related to bandwidth. Larger bandwidth of a positioning reference signal indicates a smaller interval, a more accurate estimated time peak, and a smaller positioning error. In this embodiment of this application, CFRs of a plurality of frequency bands with relatively small bandwidth are mapped to the CFR of the full bandwidth, so that a more accurate time of arrival estimate can be obtained by using the full bandwidth. The filtering window is a value selected near a peak for fine estimation.

Figure 7:
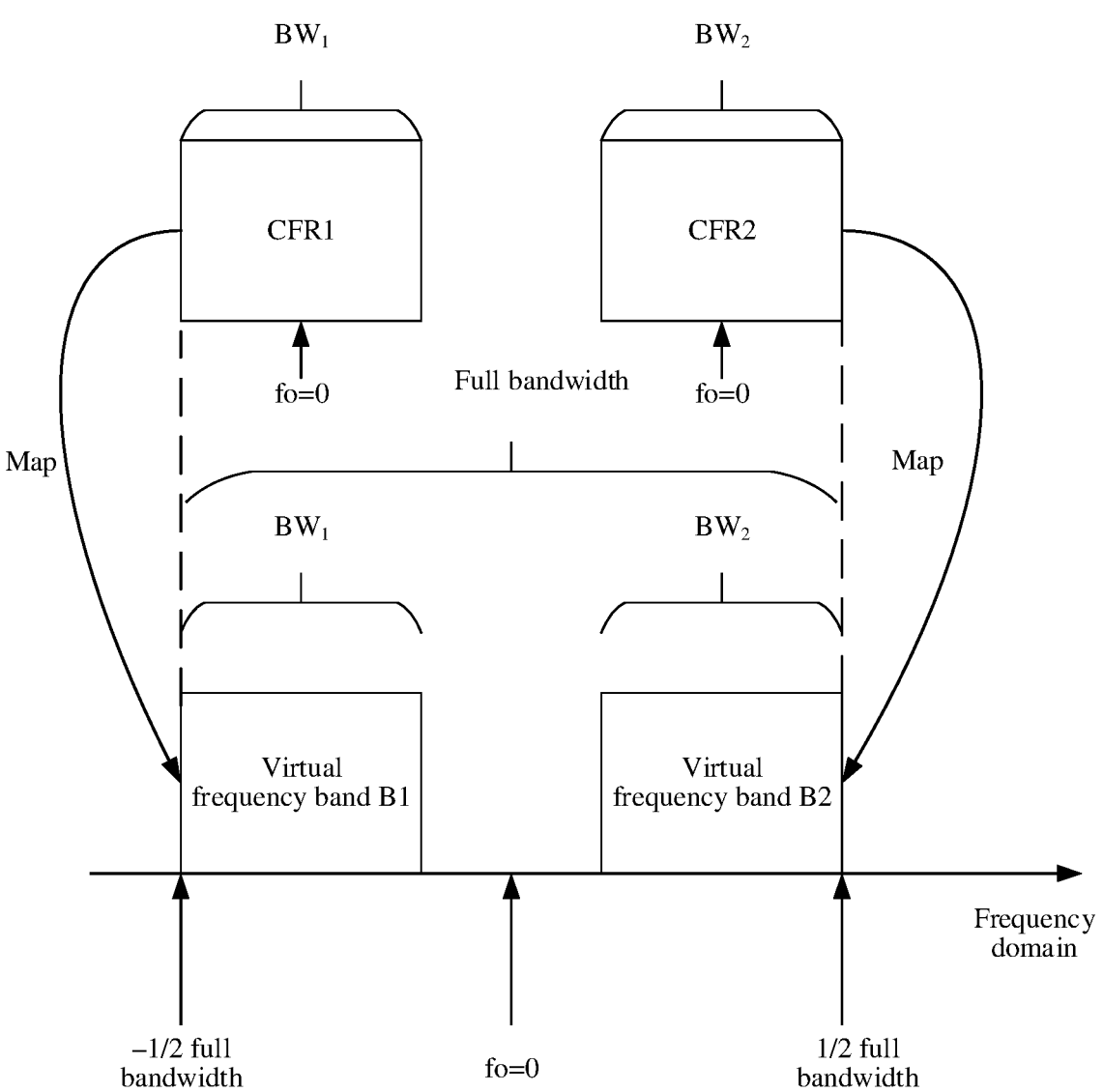
FIG. 7 is a schematic diagram 1 of mapping a frequency domain impulse response of a frequency band according to an embodiment of this application.

The terminal device transforms the filtered channel impulse responses $\bar{h}_1(t)$ and $\bar{h}_2(t)$ to frequency domain to obtain channel frequency responses CFR1 and CFR2 of the first frequency band and the second frequency band. Both CFR1 and CFR2 are baseband sequences whose center frequencies are zero. The terminal device respectively maps CFR1 and CFR2 to locations of corresponding virtual frequency bands B1 and B2 in the full baseband bandwidth Full_BW. A schematic diagram of mapping is shown in FIG. 7. A value of the CFR of the full bandwidth on B1 is CFR1, a value of the CFR of the full bandwidth on a gap frequency band between B1 and B2 is zero, and a value of the CFR of the full bandwidth on B2 is CFR2.

It is assumed that an index corresponding to B1 is $$k_1^1, k_2^1, k_3^1, k_4^1, \dots, k_{N1}^1,$$

an index corresponding to B2 is $$k_1^2, k_2^2, k_3^2, k_4^2, \dots, k_{N2}^2,$$

and a sequence of the CFR of the full bandwidth is $$R_g(k) = CFR(k_1^1, k_2^1, k_3^1, k_4^1, \dots, k_{N1}^1, k_1^2, k_2^2, k_3^2, k_4^2, \dots, k_{N2}^2).$$

The following uses an example in which there are three frequency bands and the receive end is the terminal to further describe in detail a process of determining the CFR of the full bandwidth.

The network device separately sends positioning reference signals PRSs on the first frequency band, the second frequency band, and the third frequency band, and the terminal device separately receives the positioning reference signals PRSs on the first frequency band, the second frequency band, and the third frequency band. Transmission of the PRSs is shown in FIG. 5b. The PRSs are separately sent on frequency bands B1, B2, and B3 whose center frequencies are $f_{c1}$, $f_{c2}$, and $f_{c3}$ and whose bandwidth is BW1, BW2, and BW3. The full bandwidth is defined as Full_BW= $f_{3,high}-f_{1,low}$. $f_{1,low}$ represents a lowest frequency of a PRS whose center frequency is $f_{c1}$. $f_{3,high}$ represents a highest frequency of a PRS whose center frequency is $f_{c3}$.

The terminal device determines the CFRs of the first frequency band and the second frequency band based on the three signals received on the first frequency band, the second frequency band, and the third frequency band. The terminal device may learn, based on the 20 configuration information of the LMF, that the network device sends PRSs of three frequency bands at the frequencies $f_{c1}$, $f_{c2}$, and $f_{c3}$. The terminal device separately receives the PRSs through three independent radio frequency channels. The received PRS baseband signals are separately represented by $y_1(t)$, $y_2(t)$, and $y_3(t)$. The terminal device separately performs channel estimation based on $y_1(t)$, $y_2(t)$, and $y_3(t)$, to obtain channel impulse responses $h_1(t)$, $h_2(t)$, and $h_3(t)$ of the first frequency band, the second frequency band, and the third frequency band. The terminal device separately performs coarse delay estimation based on $h_1(t)$, $h_2(t)$, and $h_3(t)$ to obtain coarse delay estimates T1, T2, and T3. The peak search method may be used for coarse delay estimation. In other words, $$T_1 = \operatorname*{argmax}_t \{|h_1(t)|\}, \ T_2 = \operatorname*{argmax}_t \{|h_2(t)|\}, \text{ and } T_3 = \operatorname*{argmax}_t \{|h_3(t)|\}.$$

Figure 8:
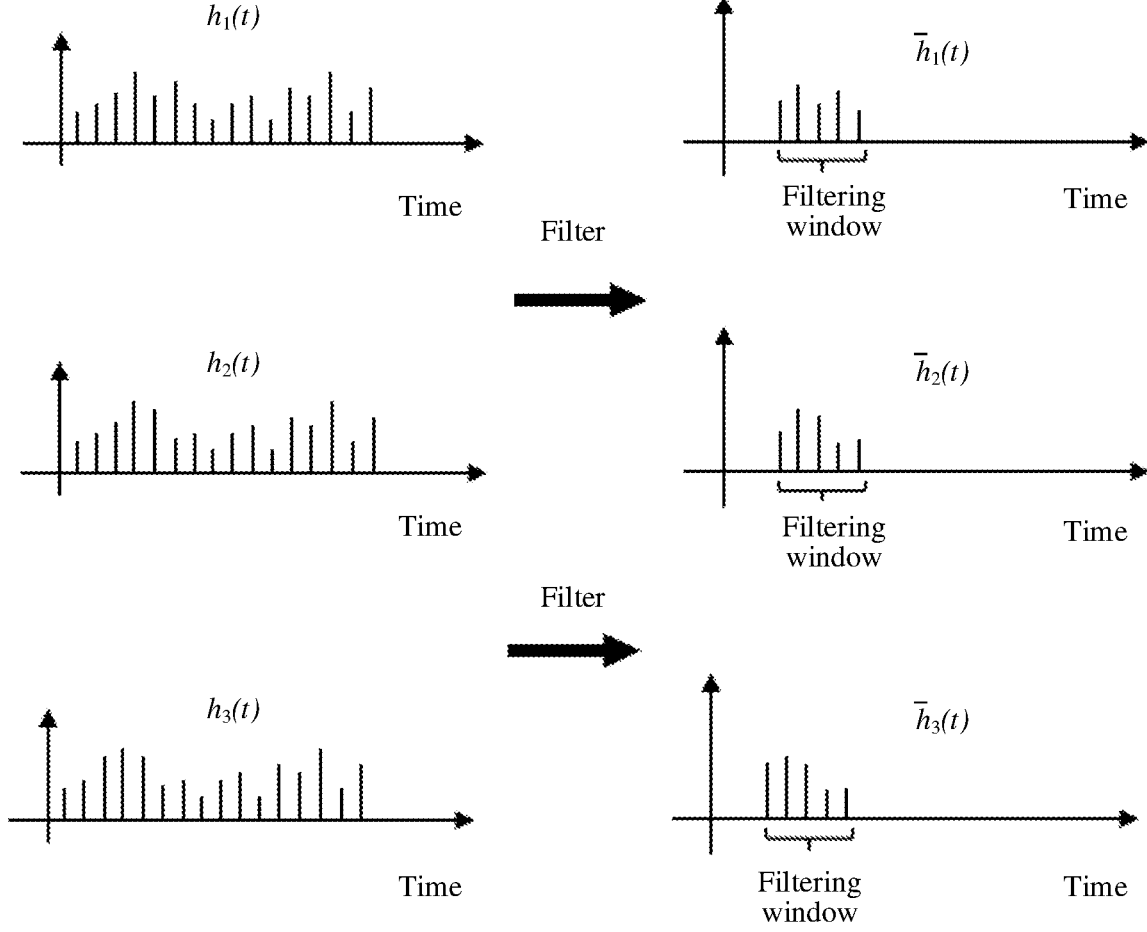
FIG. 8 is a schematic diagram 2 of filtering a channel impulse response according to an embodiment of this application.
Figure 9:
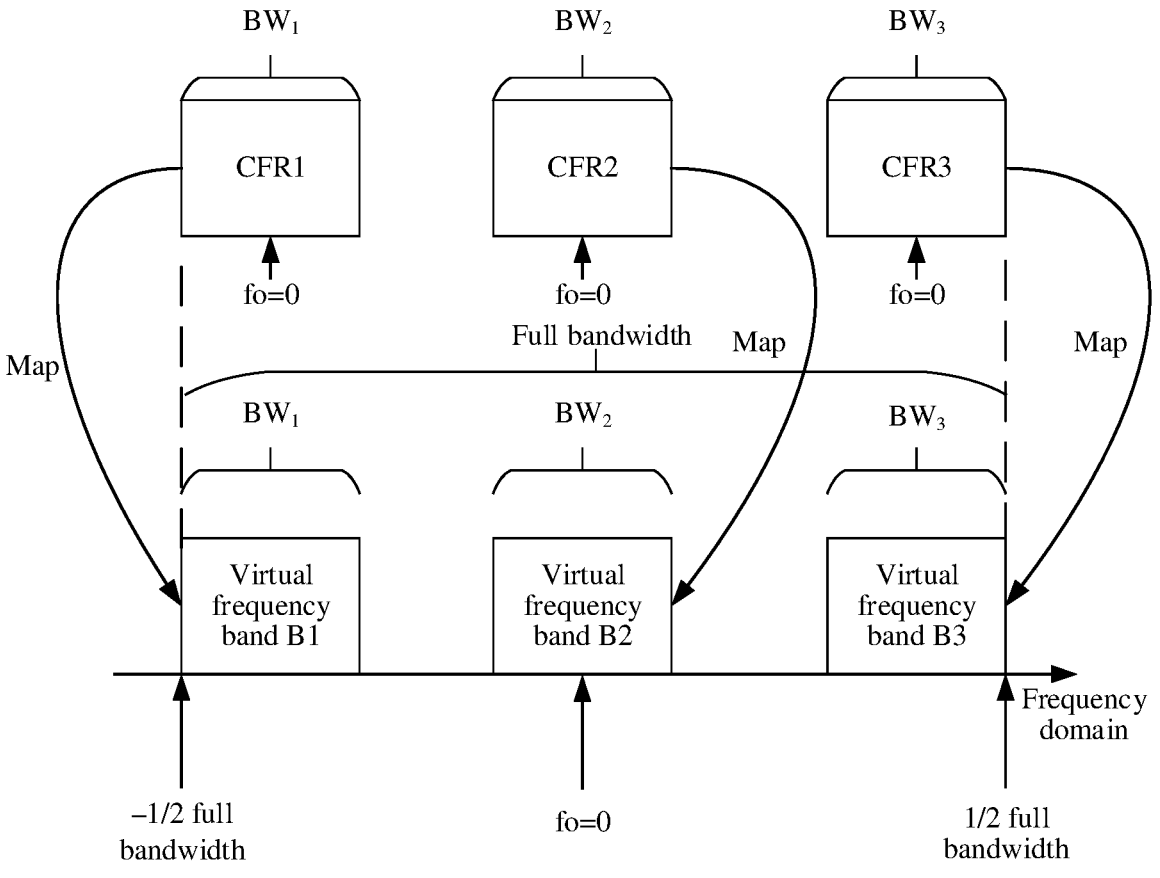
FIG. 9 is a schematic diagram 2 of mapping a frequency domain impulse response of a frequency band according to an embodiment of this application.

The terminal device obtains the coarse delay estimate $T_{cor}$ of the full bandwidth (Full_BW) through combination based on the coarse delay values T1, T2, and T3. The selection combining method may be used, and $T_{cor}$ is any one of T1, T2, and T3. The weighted combining method may alternatively be used, for example, $T_{cor}=T_1*C_1+T_2*C_2+T_3*C_3$. $C_1$, $C_2$, and $C_3$ are weighting factors of T1, T2, and T3 respectively. As shown in FIG. 8, the terminal device filters $h_1(t)$, $h_2(t)$, and $h_3(t)$ to obtain filtered channel impulse responses $\bar{h}_1(t)$, $\bar{h}_2(t)$, and $\bar{h}_3(t)$ respectively. The filtering window used for filtering is set based on $T_{cor}$. For example, the filtering window is Window=$[T_{cor}-D_{ext}, T_{cor}+D_{ext}]$, and $D_{ext}$ represents half of the filtering window. The terminal device transforms the filtered channel impulse responses $\bar{h}_1(t)$, $\bar{h}_2(t)$, and $\bar{h}_3(t)$ to frequency domain to obtain channel frequency responses CFR1, CFR2, and CFR3 of the first frequency band, the second frequency band, and the third frequency band. All of CFR1, CFR2, and CFR3 are baseband signals whose center frequencies are zero. The terminal device respectively maps CFR1, CFR2, and CFR3 to locations of corresponding virtual frequency bands B1, B2, and B3 in the full baseband bandwidth Full_BW. A schematic diagram of mapping is shown in FIG. 9. A value of the CFR of the full bandwidth on B1 is CFR1, a value of the CFR of the full bandwidth on a gap frequency band between B1 and B2 is zero, a value of the CFR of the full bandwidth on B2 is CFR2, a value of the CFR of the full bandwidth on a gap frequency band between B2 and B3 is zero, and a value of the CFR of the full bandwidth on B3 is CFR3.

It is assumed that an index corresponding to B1 is $$k_1^1, k_2^1, k_3^1, k_4^1, \dots, k_{N1}^1,$$

an index corresponding to B2 is $$k_1^2, k_2^2, k_3^2, k_4^2, \ldots, k_{N2}^2,$$

an index corresponding to B3 is $$k_1^3, k_2^3, k_3^3, k_4^3, \ldots, k_{N3}^3,$$

and a sequence of the CFR of the full bandwidth is $$R_g(k) = CFR(k_1^1, k_2^1, k_3^1, k_4^1, \ldots,$$

$$k_{N1}^1, k_1^2, k_2^2, k_3^2, k_4^2, \ldots, k_{N2}^2, k_1^3, k_2^3, k_3^3, k_4^3, \ldots, k_{N3}^3).$$

CFR information of the full bandwidth is characterized by non-contiguous spectrums. After determining the CFR of the full bandwidth, the receive end determines the time of arrival estimate based on the CFR of the full bandwidth.

Optionally, the receive end may compensate for a random phase difference between different frequency bands based on phase correction values of the plurality of frequency bands. For example, the plurality of frequency bands are the first frequency band and the second frequency band, and the receive end compensates for a random phase difference between the values of the CFR of the full bandwidth on the first frequency band and the second frequency band based on phase correction values of the first frequency band and the second frequency band. For another example, the plurality of frequency bands are the first frequency band, the second frequency band, and the third frequency band, the receive end compensates for a random phase difference between the values of the CFR of the full bandwidth on the first frequency band and the second frequency band based on phase correction values of the first frequency band and the second frequency band, the receive end compensates for a random phase difference between the values of the CFR of the full bandwidth on the second frequency band and the third frequency band based on phase correction values of the second frequency band and the third frequency band, and the receive end compensates for a random phase difference between the values of the CFR of the full bandwidth on the first frequency band and the third frequency band based on phase correction values of the first frequency band and the third frequency band.

The receive end may divide the CFR of the full bandwidth to obtain a plurality of subsequences, and determine the time of arrival estimate based on the plurality of subsequences. For example, the receive end performs comb division on the CFR of the full bandwidth to obtain a plurality of subsequences. Each of the plurality of subsequences includes a partial CFR of each of the plurality of frequency bands.

Taking two frequency bands as an example, the sequence of the CFR of the full bandwidth is $$R_g(k) = CFR(k_1^1, k_2^1, k_3^1, k_4^1, \ldots, k_{N1}^1, k_1^2, k_2^2, k_3^2, k_4^2, \ldots, k_{N2}^2).$$

Figure 10A:
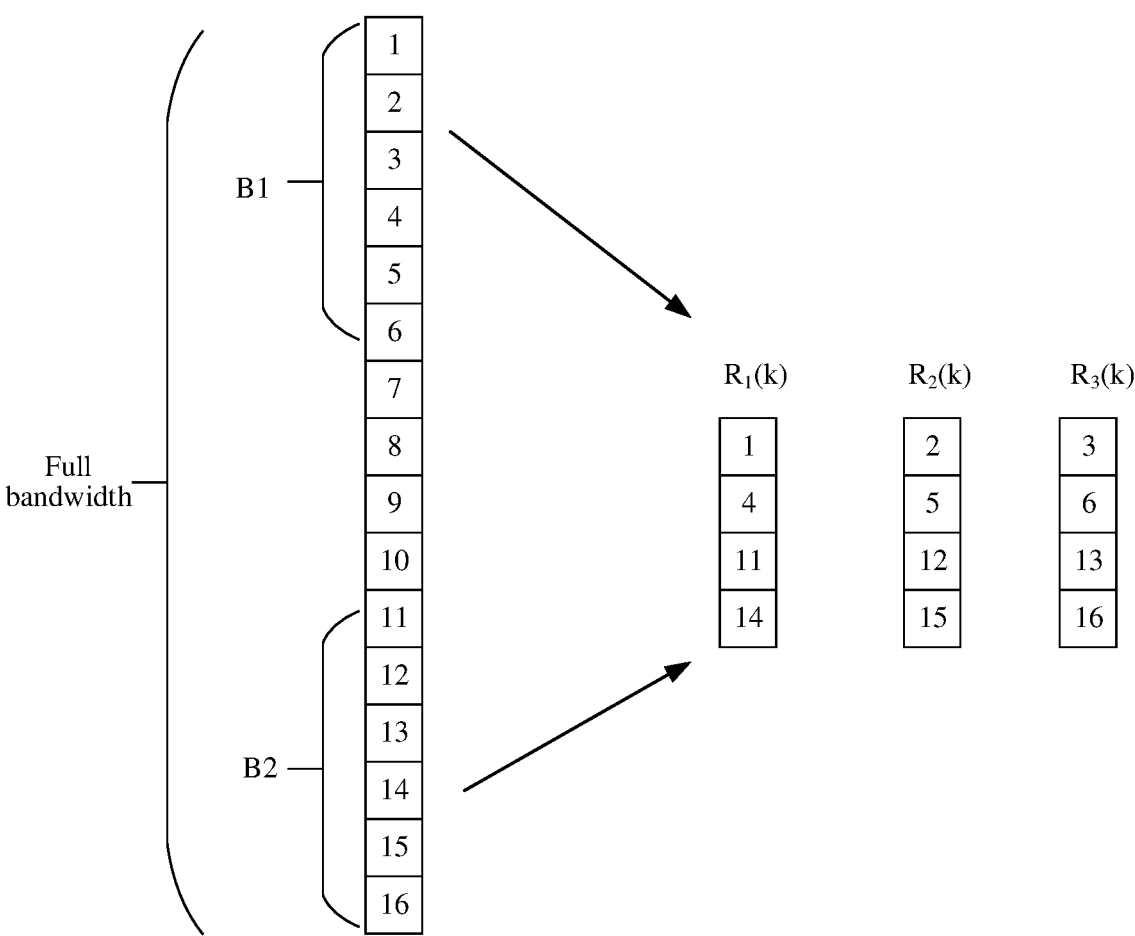
FIG. 10a is a schematic diagram 1 of dividing a sequence of a frequency domain impulse response of full bandwidth according to an embodiment of this application.

As shown in FIG. 10a, $R_g(k)$ is divided into comb-shaped m subsequences. One value is taken at an interval of a fixed spacing m to form one subsequence, and the $i^{th}$ subsequence may be represented by $R_i(k):=R_g$ (i: m: end). FIG. 10a is a schematic diagram of dividing the CFR of the full bandwidth into three subsequences. m is 3, and it is assumed that the sequence of the CFR of the full bandwidth is represented by (1, 2, 3, ..., 15, 16). (1, 2, 3, 4, 5, 6) is a sequence index corresponding to the virtual frequency band B1, (11, 12, 13, 14, 15, 16) is a sequence index corresponding to the virtual frequency band B2, (7, 8, 9, 10) in the middle is a gap frequency band, and a CFR of the gap frequency band is zero. The value of the CFR of the full bandwidth on the virtual frequency band B1 is a value of CFR1 of the first frequency band, and the value of the CFR of the full bandwidth on the virtual frequency band B2 is a value of CFR2 of the second frequency band. Values are taken based on the fixed spacing m to form three subsequences: $R_1(k)$, $R_2(k)$, and $R_3(k)$, where m=3. $R_1(k)$ includes (1, 4, 11, 14), $R_2(k)$ includes (2, 5, 12, 15), and $R_3(k)$ includes (3, 6, 13, 16).

Taking three frequency bands as an example, the sequence of the CFR of the full bandwidth is $$R_g(k) = CFR(k_1^1, k_2^1, k_3^1, k_4^1, \ldots,$$

$$k_{N1}^1, k_1^2, k_2^2, k_3^2, k_4^2, \ldots, k_{N2}^2, k_1^3, k_2^3, k_3^3, k_4^3, \ldots, k_{N1}^3).$$

Figure 10B:
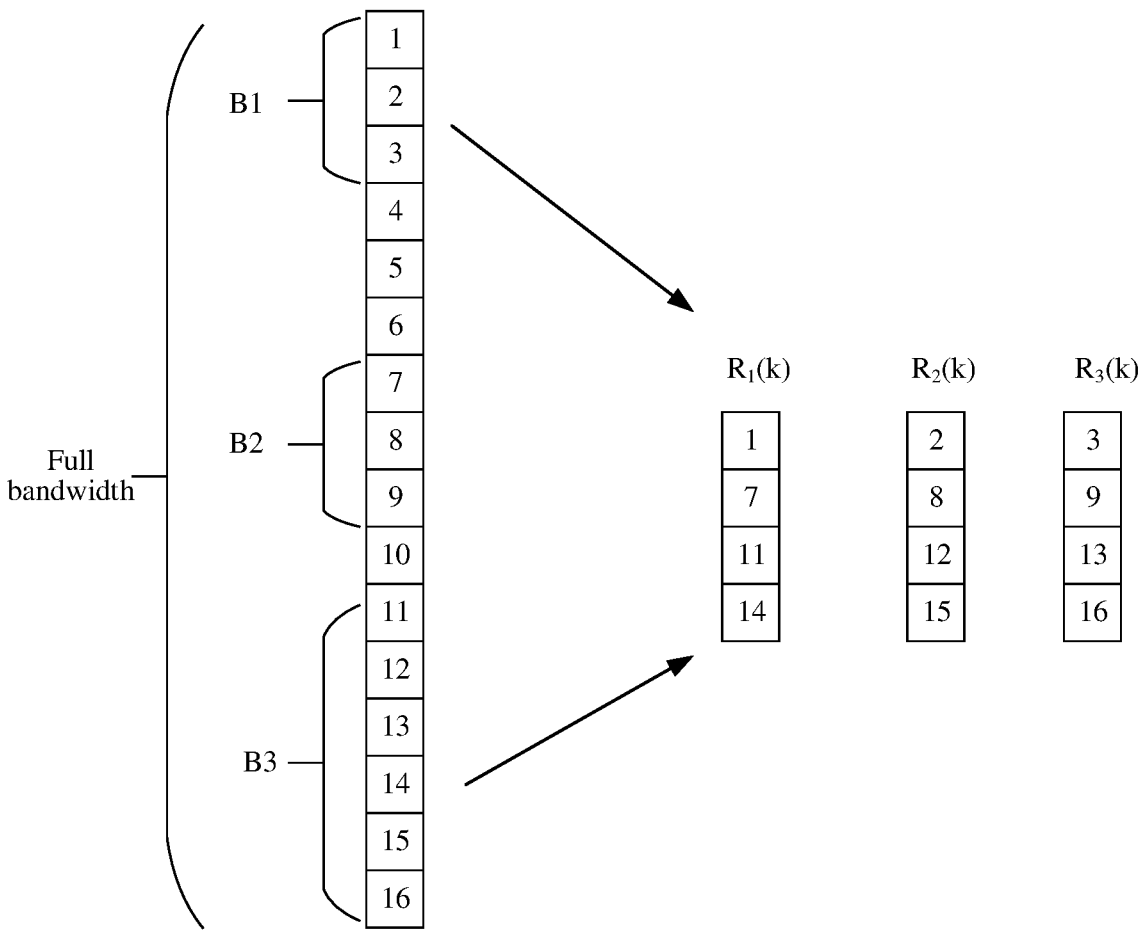
FIG. 10b is a schematic diagram 2 of dividing a sequence of a frequency domain impulse response of full bandwidth according to an embodiment of this application.

As shown in FIG. 10b, $R_g(k)$ is divided into comb-shaped m subsequences. A value is taken at an interval of a fixed spacing m to form one subsequence, and the $i^{th}$ subsequence may be represented by $R_i(k):=R_g$ (i: m: end). FIG. 10b is a schematic diagram of dividing the CFR of the full bandwidth into three subsequences. m is 3, and it is assumed that the sequence of the CFR of the full bandwidth is represented by (1, 2, 3, ..., 15, 16). (1, 2, 3) is a sequence index corresponding to the virtual frequency band B1, (7, 8, 9) is a sequence index corresponding to the virtual frequency band B2, (4, 5, 6) is a gap frequency band between the virtual frequency band B1 and the virtual frequency band B2, and (10) is a gap frequency band between the virtual frequency band B2 and the virtual frequency band B3. A CFR of the gap frequency band is zero. The value of the CFR of the full bandwidth on the virtual frequency band B1 is a value of CFR1 of the first frequency band, the value of the CFR of the full bandwidth on the virtual frequency band B2 is a value of CFR2 of the second frequency band, and the value of the CFR of the full bandwidth on the virtual frequency band B3 is a value of CFR3 of the third frequency band. Values are taken based on the fixed spacing m to form three subsequences: $R_1(k)$, $R_2(k)$, and $R_3(k)$, where m=3. $R_1(k)$ includes (1, 7, 11, 14), $R_2(k)$ includes (2, 8, 12, 15), and $R_3(k)$ includes (3, 9, 13, 16).

That the receive end determines the time of arrival estimate based on the CFR of the full bandwidth may be considered as a process of fine delay estimation. Fine delay estimation may be performed based on a manner in the conventional technology. For example, a smooth MUSIC algorithm may be used.

An autocorrelation matrix corresponding to each of the plurality of subsequences is determined based on the plurality of subsequences obtained by dividing the CFR of the full bandwidth, to obtain a plurality of autocorrelation matrices corresponding to the plurality of subsequences, a delay corresponding to a peak point of a channel delay pseudospectrum is determined based on the plurality of autocorrelation matrices, and the time of arrival estimate is determined based on the delay. For example, for each of the m subsequences, an autocorrelation matrix is calculated to obtain the autocorrelation matrix $RHH_i$, and all autocorrelation matrices are added and averaged to obtain RHH. A channel delay pseudospectrum is calculated based on RHH, and a fine delay estimate $T_{acu}$ is determined based on a delay corresponding to a peak point of the pseudospectrum.

The receive end further determines the location information of the terminal device based on the time of arrival estimate. Alternatively, the receive end further reports the time of arrival estimate to the core network positioning device, and the core network positioning device collects time of arrival estimates between the terminal device and a plurality of network devices, and performs location estimation on the terminal device based on known locations of the network devices to obtain the location information of the terminal device.

For further understanding of the method provided in embodiments of this application, the following uses an example to further describe in detail the method provided in embodiments of this application.

Figure 11:
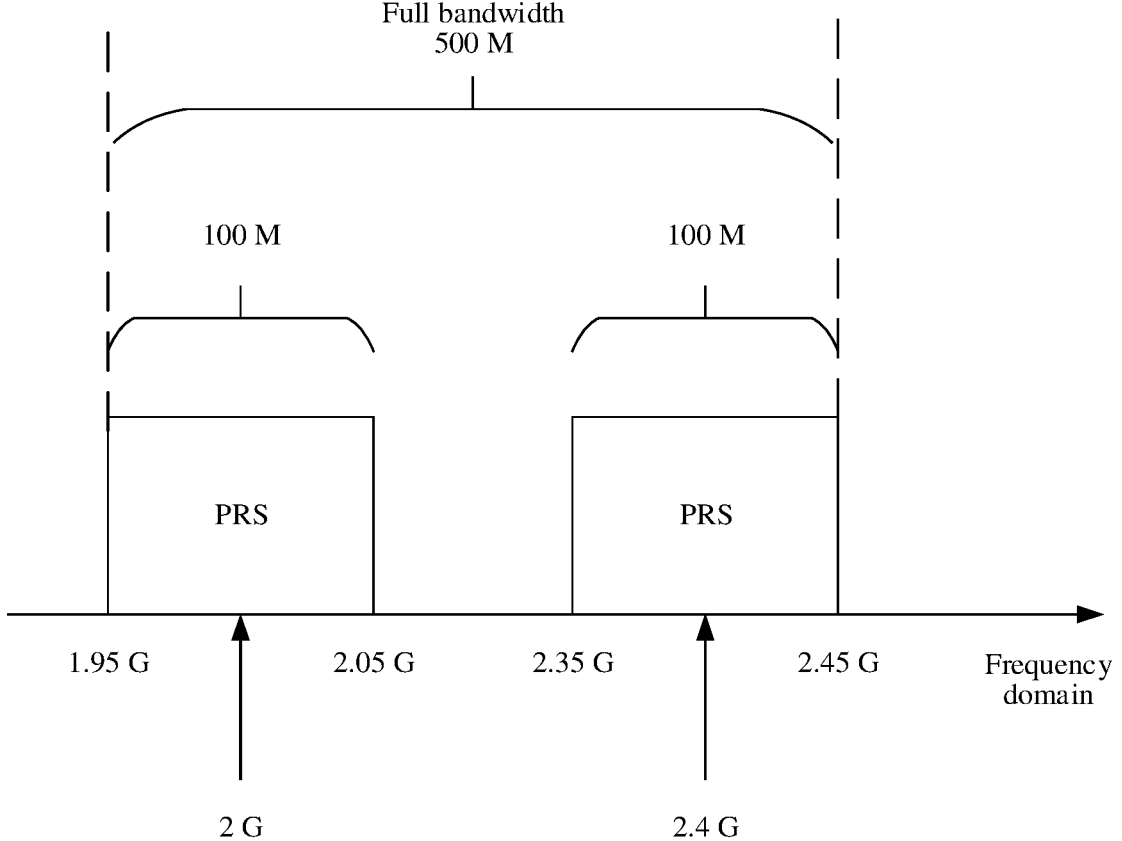
FIG. 11 is a schematic diagram 4 of non-contiguous spectrum transmission according to an embodiment of this application.

It is assumed that a terminal device is a receive end and receives a positioning reference signal PRS from a network device. As shown in FIG. 11, the network device separately sends PRS1 and PRS2 on a first frequency band and a second frequency band. Center frequencies of the first frequency band and the second frequency band are 2 GHz and 2.4 GHz respectively, and bandwidth of each of the first frequency band and the second frequency band is 100 MHz. A frequency domain range of the first frequency band is 1.95 GHz to 2.05 GHZ, and a frequency domain range of the second frequency band is 2.35 GHz to 2.45 GHz. The terminal device separately receives the signals PRS1 and PRS2 on the two frequency bands of 100 MHz. Based on the first frequency band and the second frequency band, it may be considered that the network device sends signals at locations of the first frequency band and the second frequency band of full bandwidth, and sends no signal on a middle gap frequency band of 2.05 GHz to 2.35 GHz. A start frequency domain position of the full bandwidth is 1.95 GHZ, an end frequency domain position of the full bandwidth is 2.45 GHz, and a frequency domain range of the full bandwidth is 1.95 GHz to 2.45 GHz. However, it should be understood that the network device may not have a transmission capability of bandwidth of 500 MHz. Actually, for example, the network device has a transmission capability of bandwidth of 100 MHz, and separately sends signals of 100 MHz on the first frequency band and the second frequency band, where the signals may be mapped to the full bandwidth of 500 MHz. It may be assumed that the network device has a transmission capability of bandwidth of 500 MHz, and simultaneously sends two signals of 100 MHz on the bandwidth of 500 MHz whose center frequency is 2.2 GHz and that includes 250 MHz on each of the left side and the right side of the center frequency. Therefore, time of arrival estimation can be performed based on a signal with larger bandwidth, so that positioning accuracy can be improved. Correspondingly, the terminal device may not have a receiving capability of bandwidth of 500 MHz. The terminal device only needs to have a receiving capability of bandwidth of 100 MHz. If the terminal device receives signals of 100 MHz on the first frequency band and the second frequency band, it may be equivalently considered that the terminal device receives signals on the full bandwidth of 500 MHz, for example, the terminal device separately receives signals on the first frequency band and the second frequency band of the bandwidth of 500 MHz, but receives no signal on a gap frequency band. Therefore, time of arrival estimation can be performed based on the signals with the bandwidth of 500 MHz, so that positioning accuracy is improved.

The terminal device respectively receives PRS1 and PRS2 on the first frequency band and the second frequency band through two independent radio frequency channels, and the terminal device performs channel estimation based on PRS1 and PRS2 to obtain channel impulse responses of the corresponding frequency bands. The channel impulse responses are denoted as a first channel impulse response and a second channel impulse response. The terminal device performs coarse delay estimation based on the first channel impulse response and the second channel impulse response to obtain a first coarse delay estimate and a second coarse delay estimate. The terminal device performs combination based on the first coarse delay estimate and the second coarse delay estimate to obtain a coarse delay estimate of the full bandwidth. The terminal device filters the first channel impulse response and the second channel impulse response based on the coarse delay estimate of the full bandwidth, and performs Fourier transform on a filtered first channel impulse response and a filtered second channel impulse response to obtain a first channel frequency response corresponding to the first frequency band and a second channel frequency response corresponding to the second frequency band. The first frequency impulse response and the second frequency impulse response of the channel corresponding to the second frequency band that are obtained by the terminal device are respectively obtained by performing coarse delay estimation on PRS1 and PRS2. To obtain a full-bandwidth TOA estimation gain, the first frequency impulse response and the second frequency impulse response need to be mapped to the full bandwidth to obtain a frequency impulse response of the full bandwidth.

Figure 12:
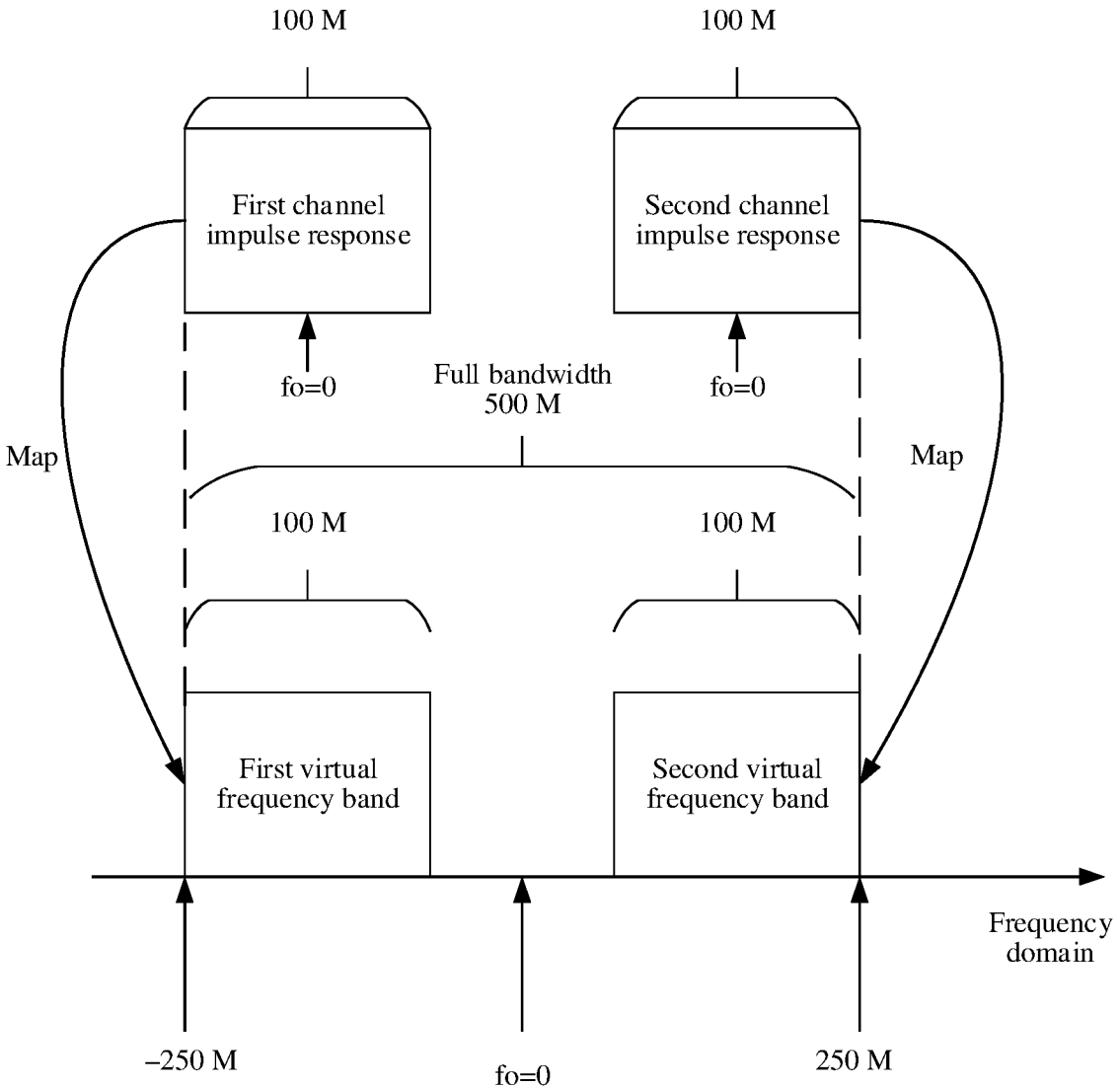
FIG. 12 is a schematic diagram 3 of mapping a frequency domain impulse response of a frequency band according to an embodiment of this application.

As shown in FIG. 12, both the first frequency impulse response and the second frequency impulse response are baseband signals whose center frequencies are zero, and the first frequency impulse response and the second frequency impulse response are mapped to corresponding locations of a first virtual frequency band and a second virtual frequency band in the full baseband bandwidth to obtain the frequency impulse response of the full bandwidth. The frequency impulse response of the full bandwidth may be understood as a frequency impulse response obtained after coarse delay estimation is performed when the network device separately and simultaneously sends signals at locations of 1.95 GHz to 2.05 GHz and 2.35 GHz to 2.45 GHz in the bandwidth of 500 MHz whose center frequency is 2.2 GHz.

It should be noted that examples in the application scenarios in this application merely show some possible implementations, and are intended for better understanding and descriptions of the method in this application. Persons skilled in the art can obtain examples of some evolved forms based on the reference signal indication method provided in this application.

In the foregoing embodiments provided in this application, the method provided in embodiments of this application is separately described from perspectives of the network device, the terminal, and interaction between the network device and the terminal. To implement functions in the method provided in the foregoing embodiments of this application, the network device and the terminal each may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on a specific application and a design constraint of the technical solutions.

Figure 13:
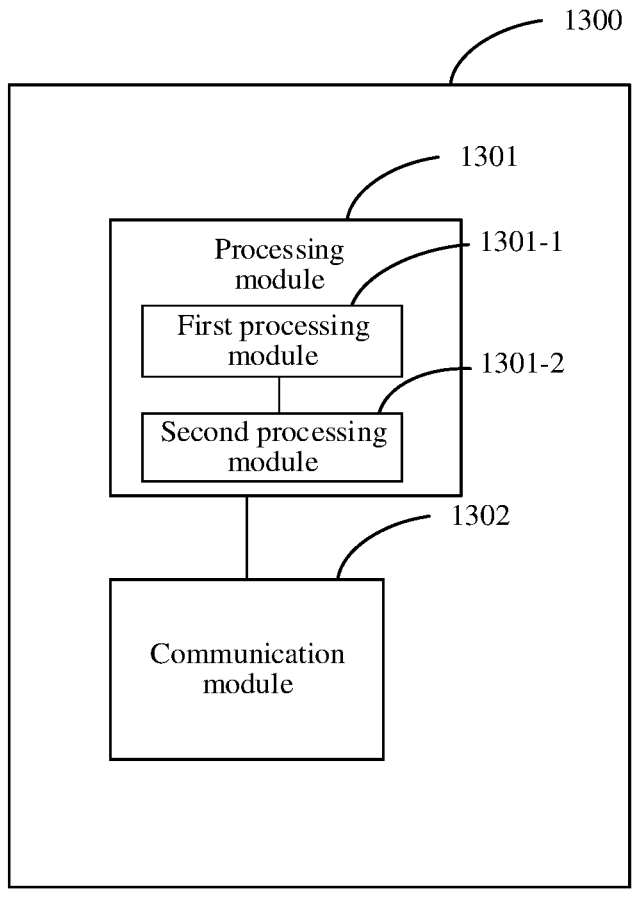
FIG. 13 is a schematic diagram 1 of a structure of a communication apparatus according to an embodiment of this application.

As shown in FIG. 13, based on the same technical concept, an embodiment of this application further provides an apparatus 1300. The apparatus 1300 may be a terminal device or a network device, or may be an apparatus in a terminal device or a network device, or may be an apparatus that can be used together with a terminal device or a network device. In a design, the apparatus 1300 may include modules that are in a one-to-one correspondence with the methods/operations/steps/actions performed by the terminal device or the network device in the foregoing method embodiments. The module may be implemented by a hardware circuit, software, or a combination of a hardware circuit and software. In a design, the apparatus may include a processing module 1301 and a communication module 1302. The processing module 1301 is configured to invoke the communication module 1302 to perform a receiving function and/or a sending function. The processing module 1301 may be further divided into a first processing module 1301-1 and a second processing module 1301-2.

The communication module 1302 is configured to receive a plurality of signals from a transmit end on a plurality of frequency bands. The plurality of frequency bands are in a one-to-one correspondence with the plurality of signals.

The first processing module 1301-1 is configured to: determine, based on the plurality of signals, channel frequency responses CFRs of the frequency bands corresponding to the plurality of signals; and determine a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end. There is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero.

The second processing module 1301-2 is configured to determine a time of arrival estimate based on the CFR of the full bandwidth. The time of arrival estimate is used to determine location information of a terminal device.

The communication module 1302 is further configured to perform another receiving or sending step or operation performed by the receive end in the foregoing method embodiments. The first processing module 1301-1 and the second processing module 1301-2 may be further configured to perform other corresponding steps or operations performed by the receive end other than receiving and sending in the foregoing method embodiments, and details are not described herein again.

Division into modules in this embodiment of this application is an example, is merely logical function division, and may be other division in an actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 14:
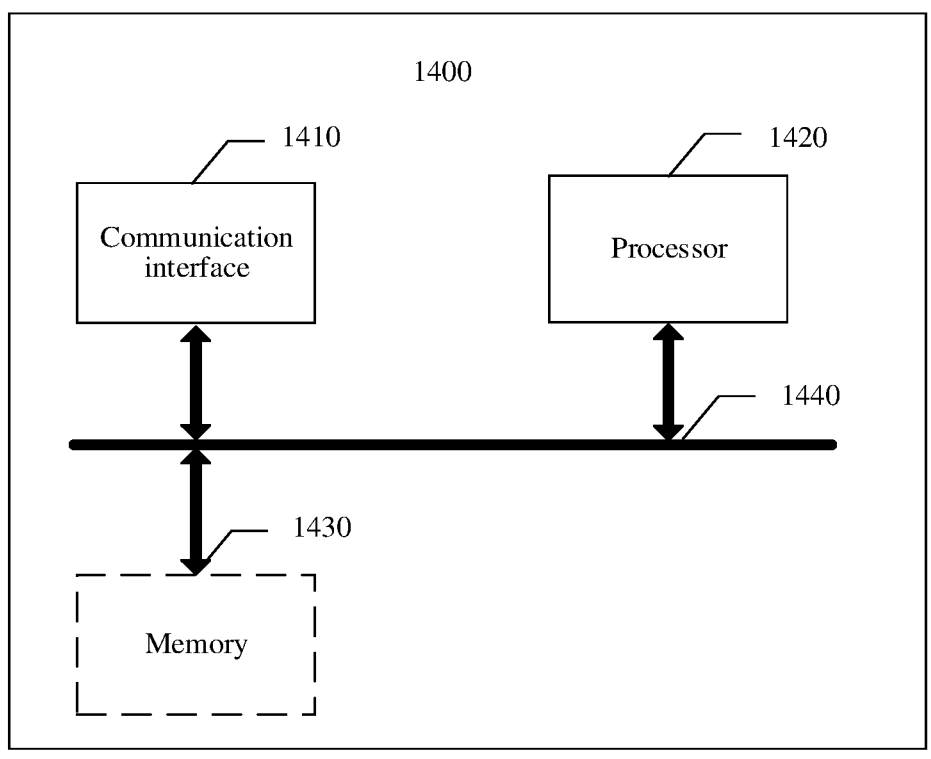
FIG. 14 is a schematic diagram 2 of a structure of a communication apparatus according to an embodiment of this application.

FIG. 14 shows a communication apparatus 1400 according to an embodiment of this application. The communication apparatus 1400 is configured to implement functions of the receive end in the foregoing method. When the receive end is a network device, the communication apparatus may be the network device, or may be an apparatus in the network device, or may be an apparatus that can be used together with the network device. When the receive end is a terminal device, the communication apparatus may be the terminal device, or may be an apparatus in the terminal device, or may be an apparatus that can be used together with the terminal device. The communication apparatus may be a chip system. In this embodiment of this application, the chip system may include a chip, or may include a chip and another discrete component. The communication apparatus 1400 includes at least one processor 1420, configured to implement functions of the receive end (including the terminal device or the network device) in the method provided in embodiments of this application. The communication apparatus 1400 may further include a communication interface 1410. In this embodiment of this application, the communication interface may be a transceiver, a circuit, a bus, a module, or another type of communication interface, and is configured to communicate with another device through a transmission medium. For example, the communication interface 1410 is used by an apparatus in the communication apparatus 1400 to communicate with another device.

For example, the communication interface 1410 is configured to receive a plurality of signals from a transmit end on a plurality of frequency bands. The plurality of frequency bands are in a one-to-one correspondence with the plurality of signals.

The processor 1420 is configured to invoke a group of programs or instructions to perform the following operations:

determining, based on the plurality of signals, channel frequency responses CFRs of the frequency bands corresponding to the plurality of signals: determining a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end, where there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and determining a time of arrival estimate based on the CFR of the full bandwidth, where the time of arrival estimate is used to determine location information of a terminal device.

Optionally, when determining, based on the plurality of signals, the channel frequency responses CFRs of the frequency bands corresponding to the plurality of signals, the processor 1420 is configured to:

determine a coarse delay estimate of the full bandwidth based on the plurality of signals;

determine a filtering window based on the coarse delay estimate of the full bandwidth, and separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

Optionally, when determining the coarse delay estimate of the full bandwidth based on the plurality of signals, the processor 1420 is configured to:

separately perform channel estimation on the plurality of signals to obtain the channel impulse responses of the frequency bands corresponding to the plurality of signals;

separately perform coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

Optionally, the coarse delay estimate of the full bandwidth is a coarse delay estimate corresponding to one of the plurality of frequency bands; or the coarse delay estimate of the full bandwidth is a value obtained by performing weighted combining on some or all of the coarse delay estimates corresponding to the plurality of frequency bands.

Optionally, when determining the time of arrival estimate based on the CFR of the full bandwidth, the processor 1420 is configured to:

divide the CFR of the full bandwidth to obtain a plurality of subsequences, where each of the plurality of subsequences includes a partial CFR of each of the plurality of frequency bands; and determine the time of arrival estimate based on the plurality of subsequences.

Optionally, when determining the time of arrival estimate based on the plurality of subsequences, the processor 1420 is configured to:

determine an autocorrelation matrix corresponding to each of the plurality of subsequences to obtain a plurality of autocorrelation matrices corresponding to the plurality of subsequences;

determine, based on the plurality of autocorrelation matrices, a delay corresponding to a peak point of a channel delay pseudospectrum; and determine the time of arrival estimate based on the delay.

Optionally, the communication apparatus 1400 includes at least one memory 1430. The memory is configured to store the programs or the instructions invoked by the processor 1420, and may further store data. The memory 1430 is coupled to the processor 1420. The coupling in this embodiment of this application may be indirect coupling or a communication connection between apparatuses, units, or modules in an electrical form, a mechanical form, or another form, and is used for information exchange between the apparatuses, the units, or the modules. The processor 1420 may operate with the memory 1430 together. The processor 1420 may execute the program instructions stored in the memory 1430. At least one of the at least one memory may be included in the processor.

A connection medium between the communication interface 1410, the processor 1420, and the memory 1430 is not limited in this embodiment of this application. In this embodiment of this application, the memory 1430, the processor 1420, and the communication interface 1410 are connected to each other through a bus 1440 in FIG. 14. The bus is represented by a bold line in FIG. 14. A connection manner between other components is merely an example for description, and imposes no limitation. The bus may be classified into an address bus, a data bus, a control bus, and the like. For ease of representation, only one bold line is used to represent the bus in FIG. 14, but this does not mean that there is only one bus or only one type of bus.

When the communication apparatus 1300 and the communication apparatus 1400 are chips or chip systems, the communication module 1302 and the communication interface 1410 may output or receive baseband signals. When the communication apparatus 1300 and the communication apparatus 1400 are devices, the communication module 1302 and the communication interface 1410 may output or receive radio frequency signals. In this embodiment of this application, the processor may be a general-purpose processor, a digital signal processor, an application-specific integrated circuit, a field programmable gate array or another programmable logic device, a discrete gate or a transistor logic device, or a discrete hardware component. The processor can implement or execute the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In this embodiment of this application, the memory 1430 may be a non-volatile memory such as a hard disk drive (HDD) or a solid-state drive (SSD), or may be a volatile memory such as a random-access memory (RAM). The memory is any other medium that can be used to carry or store expected program code in a form of instructions or a data structure and that can be accessed by a computer, but is not limited thereto. Alternatively, the memory in this embodiment of this application may be a circuit or any other apparatus that can implement a storage function, and is configured to store the program instructions and/or the data.

Based on the foregoing descriptions, in an embodiment, an embodiment of this application further provides a communication apparatus 1500, configured to implement functions of the receive end in the foregoing method. The communication apparatus 1500 may be implemented by using the communication apparatus 1300, or may be implemented by using the communication apparatus 1400. The communication apparatus 1500 includes a hardware processing module 1501, a baseband digital signal processing (DSP) algorithm module 1502, and a communication interface 1503. The communication interface 1503 may be a transceiver, a circuit, a bus, a module, or another type of communication interface, and is configured to communicate with another device through a transmission medium. For example, the communication interface 1503 is used by an apparatus in the communication apparatus 1500 to communicate with another device.

The communication interface 1503 is configured to receive a plurality of signals from a transmit end on a plurality of frequency bands. The plurality of frequency bands are in a one-to-one correspondence with the plurality of signals.

The hardware processing module 1501 is configured to: determine, based on the plurality of signals, channel frequency responses CFRs of the frequency bands corresponding to the plurality of signals; and determine a CFR of full bandwidth based on the CFRs of the frequency bands corresponding to the plurality of signals, where the full bandwidth includes the plurality of frequency bands, and a frequency domain range of the full bandwidth is the same as a frequency domain range of the plurality of signals at the transmit end. There is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero.

The hardware processing module 1501 sends the CFR of the full bandwidth to the baseband DSP algorithm module 1502. The baseband DSP algorithm module 1502 is configured to determine a time of arrival estimate based on the CFR of the full bandwidth from the hardware processing module 1501.

Optionally, when determining, based on the plurality of signals, the channel frequency responses CFRs of the frequency bands corresponding to the plurality of signals, the hardware processing module 1501 is configured to:

determine a coarse delay estimate of the full bandwidth based on the plurality of signals;

determine a filtering window based on the coarse delay estimate of the full bandwidth, and separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

Optionally, when determining the coarse delay estimate of the full bandwidth based on the plurality of signals, the hardware processing module 1501 is configured to:

separately perform channel estimation on the plurality of signals to obtain the channel impulse responses of the frequency bands corresponding to the plurality of signals;

separately perform coarse delay estimation based on the channel impulse responses of the frequency bands corresponding to the plurality of signals to obtain a plurality of coarse delay estimates, where the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

Optionally, the coarse delay estimate of the full bandwidth is a coarse delay estimate corresponding to one of the plurality of frequency bands; or the coarse delay estimate of the full bandwidth is a value obtained by performing weighted combining on some or all of the coarse delay estimates corresponding to the plurality of frequency bands.

Optionally, when determining the time of arrival estimate based on the CFR of the full bandwidth, the baseband DSP algorithm module 1502 is configured to:

divide the CFR of the full bandwidth to obtain a plurality of subsequences, where each of the plurality of subsequences includes a partial CFR of each of the plurality of frequency bands; and determine the time of arrival estimate based on the plurality of subsequences.

Optionally, when determining the time of arrival estimate based on the plurality of subsequences, the baseband DSP algorithm module 1502 is configured to:

determine an autocorrelation matrix corresponding to each of the plurality of subsequences to obtain a plurality of autocorrelation matrices corresponding to the plurality of subsequences;

determine, based on the plurality of autocorrelation matrices, a delay corresponding to a peak point of a channel delay pseudospectrum; and determine the time of arrival estimate based on the delay.

Optionally, the communication apparatus 1500 includes at least one memory 1504, and the memory is configured to store programs or instructions invoked by the hardware processing module 1501 and the baseband DSP algorithm module 1502, and may further store data. The memory 1504 is coupled to the hardware processing module 1501 and the baseband DSP algorithm module 1502. The coupling in this embodiment of this application may be indirect coupling or a communication connection between apparatuses, units, or modules in an electrical form, a mechanical form, or another form, and is used for information exchange between the apparatuses, the units, or the modules. The hardware processing module 1501 and the baseband DSP algorithm module 1502 may operate with the memory 1504 together. The hardware processing module 1501 and the baseband DSP algorithm module 1502 may execute the program instructions stored in the memory 1504. At least one of the at least one memory may be included in the hardware processing module 1501 and the baseband DSP algorithm module 1502.

A connection medium between the communication interface 1503, the hardware processing module 1501, the baseband DSP algorithm module 1502, and the memory 1504 is not limited in this embodiment of this application. In this embodiment of this application, the memory 1504, the hardware processing module 1501, the baseband DSP algorithm module 1502, and the communication interface 1503 are connected to each other through a bus 1505 in FIG. 15. The bus is represented by a bold line in FIG. 15. A connection manner between other components is merely an example for description, and imposes no limitation. The bus may be classified into an address bus, a data bus, a control bus, and the like. For ease of representation, only one bold line is used to represent the bus in FIG. 15, but this does not mean that there is only one bus or only one type of bus.

In this embodiment of this application, the hardware processing module 1501 builds some modules of the receive end through hardware programming. The hardware processing module 1501 is a dedicated chip and is a built chip instead of a general-purpose chip. Therefore, operation efficiency can be improved, and a delay and power consumption can be reduced. The baseband DSP algorithm module 1502 is a chip that can implement software programming, and may be programmed by using software to implement different algorithm functions. The baseband DSP algorithm module 1502 is not a built chip that performs a specific function.

In this embodiment of this application, the memory 1504 may be a non-volatile memory such as a hard disk drive (HDD) or a solid-state drive (SSD), or may be a volatile memory such as a random-access memory (RAM). The memory is any other medium that can be used to carry or store expected program code in a form of instructions or a data structure and that can be accessed by a computer, but is not limited thereto. Alternatively, the memory in this embodiment of this application may be a circuit or any other apparatus that can implement a storage function, and is configured to store the program instructions and/or the data.

Figure 15:
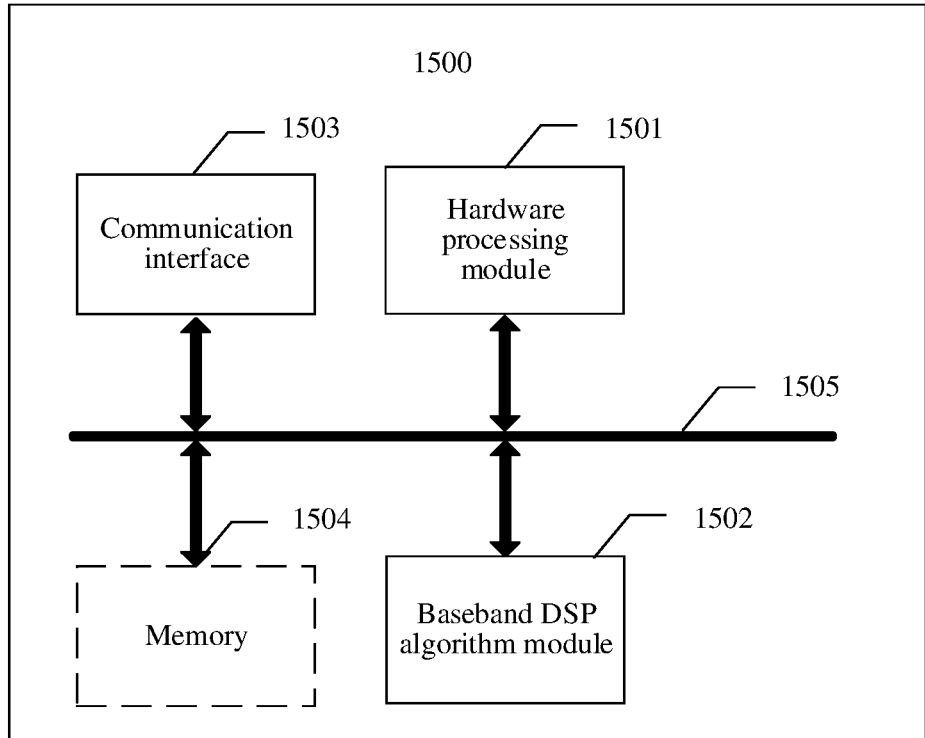
FIG. 15 is a schematic diagram 3 of a structure of a communication apparatus according to an embodiment of this application.
Figure 16:
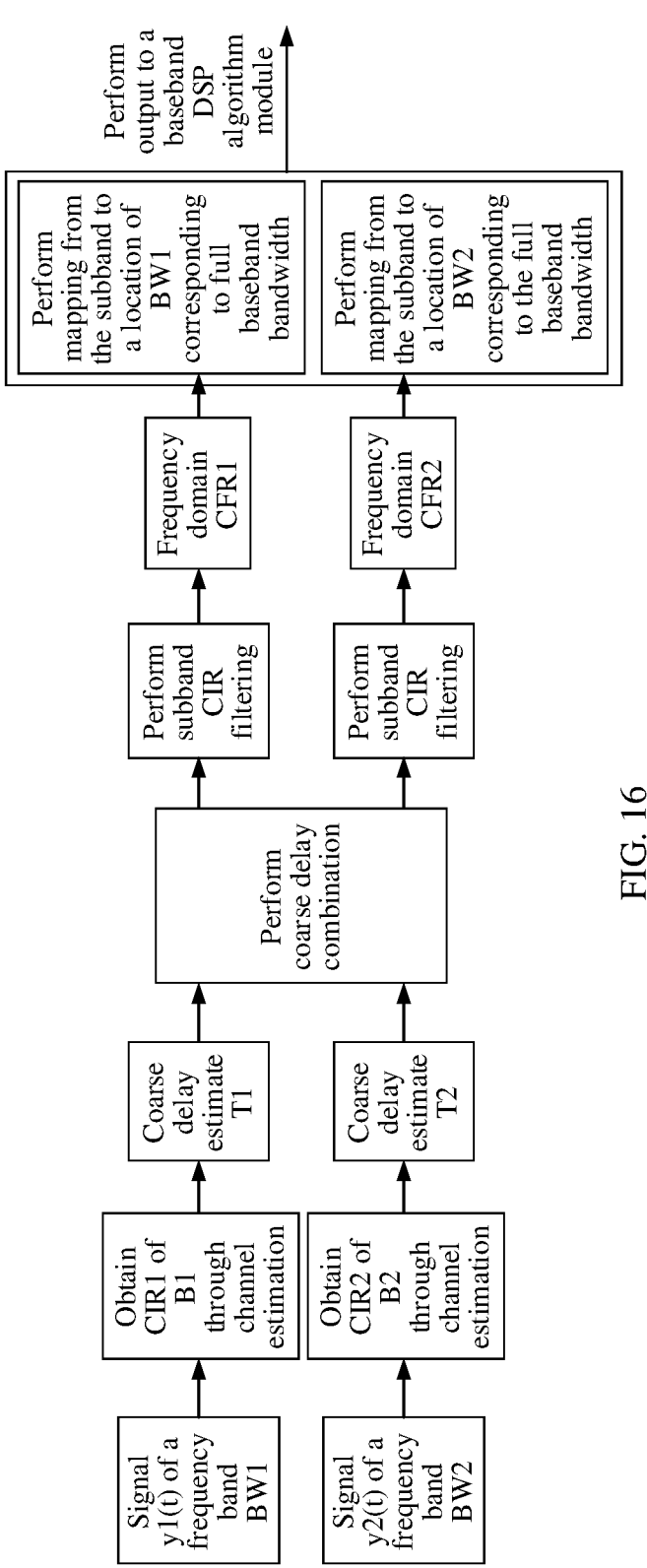
FIG. 16 is a schematic flowchart 2 of a method for estimating a time of arrival based on non-contiguous spectrums according to an embodiment of this application.
Figure 17:
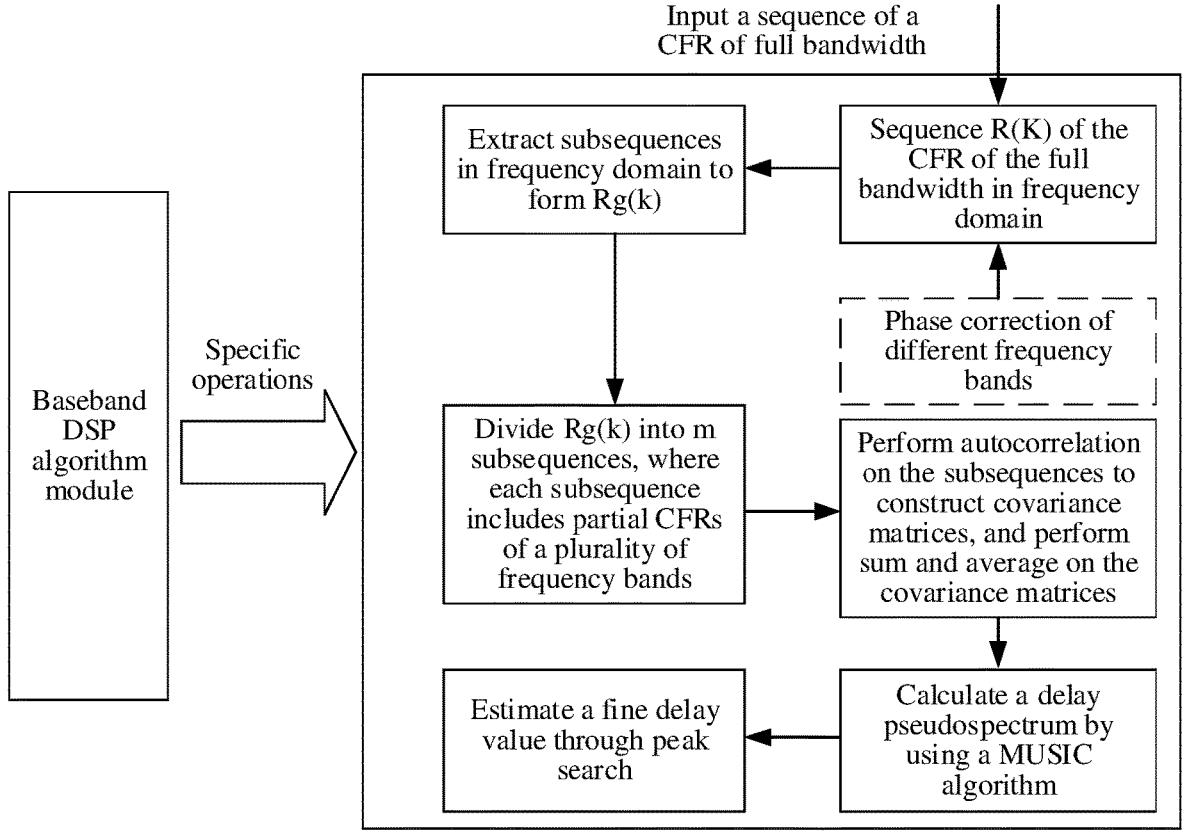
FIG. 17 is a schematic flowchart 3 of a method for estimating a time of arrival based on non-contiguous spectrums according to an embodiment of this application.

Based on the communication apparatus shown in FIG. 15, schematic flowcharts of the method provided in embodiments of this application are shown in FIG. 16 and FIG. 17. Two frequency bands are used as an example. For an example method, refer to the foregoing method embodiments. Details are not described herein again.

Some or all of the operations and functions performed by the receive end described in the foregoing method embodiments of this application may be implemented by using a chip or an integrated circuit.

To implement the functions of the communication apparatus in FIG. 13, FIG. 14, or FIG. 15, an embodiment of this application further provides a chip, including a processor, configured to support the communication apparatus in implementing the functions of the terminal or the network device in the foregoing method embodiments. In a possible design, the chip is connected to a memory or the chip includes a memory, and the memory is configured to store program instructions and data for the communication apparatus. It should be noted that when the chip implements the functions of the communication apparatus in FIG. 15, the chip may further include a first chip and a second chip. The first chip corresponds to the hardware processing module 1501, and the second chip corresponds to the baseband DSP algorithm module 1502.

An embodiment of this application provides a computer-readable storage medium. The computer-readable storage medium stores a computer program, and the computer program includes instructions used to perform the foregoing method embodiments.

An embodiment of this application provides a computer program product including instructions. When the computer program product runs on a computer, the foregoing method embodiments are implemented.

Persons skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations of embodiments of this application provided that they fall within the scope of protection defined by the following claims of this application and their equivalent technologies.

What is claimed is:

1. A method for estimating a time of arrival based on non-contiguous spectrums, the method comprising:
 receiving a plurality of signals from a transmit end on a plurality of frequency bands, wherein the plurality of frequency bands are in a one-to-one correspondence with the plurality of signals;
 determining, based on the plurality of signals, channel frequency responses (CFRs) of the frequency bands corresponding to the plurality of signals;
 determining a CFR of a full bandwidth based on the CFRs of the frequency bands corresponding to the plurality of signals, wherein the full bandwidth comprises the plurality of frequency bands, and a frequency domain range of the full bandwidth is the same as a frequency domain range of the plurality of signals at the transmit end, wherein there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and
 determining a time of arrival estimate based on the CFR of the full bandwidth, wherein the time of arrival estimate is used to determine location information of a terminal device.

2. The method according to claim 1, wherein the determining, based on the plurality of signals, the CFRs of the frequency bands corresponding to the plurality of signals comprises:
 determining a coarse delay estimate of the full bandwidth based on the plurality of signals;
 determining a filtering window based on the coarse delay estimate of the full bandwidth;
 separately filtering, based on the filtering window, channel impulse responses of the frequency bands corresponding to the plurality of signals to obtain a plurality of filtered channel impulse responses; and separately performing frequency domain transformation on the plurality of filtered channel impulse responses to obtain the CFRs of the frequency bands corresponding to the plurality of signals.

3. The method according to claim 2, wherein the determining the coarse delay estimate of the full bandwidth based on the plurality of signals comprises:

separately performing channel estimation on the plurality of signals to obtain the channel impulse responses of the frequency bands corresponding to the plurality of signals;

separately performing coarse delay estimation based on the channel impulse responses of the frequency bands corresponding to the plurality of signals to obtain a plurality of coarse delay estimates, wherein the plurality of coarse delay estimates are in a one-to-one correspondence with the channel impulse responses of the frequency bands corresponding to the plurality of signals; and determining the coarse delay estimate of the full bandwidth based on the plurality of coarse delay estimates.

4. The method according to claim 2, wherein the coarse delay estimate of the full bandwidth is a coarse delay estimate corresponding to one of the plurality of frequency bands.

5. The method according to claim 1, wherein the determining the time of arrival estimate based on the CFR of the full bandwidth comprises:

dividing the CFR of the full bandwidth to obtain a plurality of subsequences, wherein each of the plurality of subsequences comprises a partial CFR of each of the plurality of frequency bands; and determining the time of arrival estimate based on the plurality of subsequences.

6. The method according to claim 5, wherein the determining the time of arrival estimate based on the plurality of subsequences comprises:

determining an autocorrelation matrix corresponding to each of the plurality of subsequences to obtain a plurality of autocorrelation matrices corresponding to the plurality of subsequences;

determining, based on the plurality of autocorrelation matrices, a delay corresponding to a peak point of a channel delay pseudospectrum; and determining the time of arrival estimate based on the delay.

7. A communication apparatus, comprising:

a communication interface, wherein the communication interface is configured to receive a plurality of signals from a transmit end on a plurality of frequency bands, wherein the plurality of frequency bands are in a one-to-one correspondence with the plurality of signals; and a processor configured to execute a group of programs or instructions that, when executed by the processor, cause the communication apparatus to:

determine, based on the plurality of signals, channel frequency responses (CFRs) of the frequency bands corresponding to the plurality of signals;

determine a CFR of a full bandwidth based on the CFRs of the frequency bands corresponding to the plurality of signals, wherein the full bandwidth comprises the plurality of frequency bands, and a frequency domain range of the full bandwidth is the same as a frequency domain range of the plurality of signals at the transmit end, wherein there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and determine a time of arrival estimate based on the CFR of the full bandwidth, wherein the time of arrival estimate is used to determine location information of a terminal device.

8. The communication apparatus according to claim 7, wherein to determine, based on the plurality of signals, the CFRs of the frequency bands corresponding to the plurality of signals, the communication apparatus is caused to:

determine a coarse delay estimate of the full bandwidth based on the plurality of signals;

determine a filtering window based on the coarse delay estimate of the full bandwidth;

separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

9. The communication apparatus according to claim 8, wherein to determine the coarse delay estimate of the full bandwidth based on the plurality of signals, the communication apparatus is caused to:

separately perform channel estimation on the plurality of signals to obtain the channel impulse responses of the frequency bands corresponding to the plurality of signals;

separately perform coarse delay estimation based on the channel impulse responses of the frequency bands corresponding to the plurality of signals to obtain a plurality of coarse delay estimates, wherein the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

10. The communication apparatus according to claim 8, wherein the coarse delay estimate of the full bandwidth is a coarse delay estimate corresponding to one of the plurality of frequency bands; or the coarse delay estimate of the full bandwidth is a value obtained by performing weighted combining on some or all of the coarse delay estimates corresponding to the plurality of frequency bands.

11. The communication apparatus according to claim 7, wherein to determine the time of arrival estimate based on the CFR of the full bandwidth, the communication apparatus is caused to:

divide the CFR of the full bandwidth to obtain a plurality of subsequences, wherein each of the plurality of subsequences comprises a partial CFR of each of the plurality of frequency bands; and determine the time of arrival estimate based on the plurality of subsequences.

12. The communication apparatus according to claim 11, wherein to determine the time of arrival estimate based on the plurality of subsequences, the communication apparatus is caused to:

determine an autocorrelation matrix corresponding to each of the plurality of subsequences to obtain a plurality of autocorrelation matrices corresponding to the plurality of subsequences;

determine, based on the plurality of autocorrelation matrices, a delay corresponding to a peak point of a channel delay pseudospectrum; and determine the time of arrival estimate based on the delay.

13. The communication apparatus according to claim 7, further comprising:

a memory, having the programs or the instructions stored thereon that are executed by the processor.

14. A non-transitory computer readable storage medium, storing computer instructions that, when executed by a network device, cause the network device to:

receive a plurality of signals from a transmit end on a plurality of frequency bands, wherein the plurality of frequency bands are in a one-to-one correspondence with the plurality of signals;

determine, based on the plurality of signals, channel frequency responses (CFRs) of the frequency bands corresponding to the plurality of signals;

determine a CFR of a full bandwidth based on the CFRs of the frequency bands corresponding to the plurality of signals, wherein the full bandwidth comprises the plurality of frequency bands, and a frequency domain range of the full bandwidth is the same as a frequency domain range of the plurality of signals at the transmit end, wherein there is a gap frequency band between every two adjacent frequency bands in the plurality of frequency bands, values of the CFR of the full bandwidth on the plurality of frequency bands are values of the CFRs corresponding to the plurality of frequency bands, and a value of the CFR of the full bandwidth on the gap frequency band is zero; and determine a time of arrival estimate based on the CFR of the full bandwidth, wherein the time of arrival estimate is used to determine location information of a terminal device.

15. The non-transitory computer readable storage medium according to claim 14, wherein to determine, based on the plurality of signals, the CFRs of the frequency bands corresponding to the plurality of signals, the network device is caused to:

determine a coarse delay estimate of the full bandwidth based on the plurality of signals;

determine a filtering window based on the coarse delay estimate of the full bandwidth;

separately filter, based on the filtering window, channel impulse responses of the frequency bands corresponding to the plurality of signals to obtain a plurality of filtered channel impulse responses; and separately perform frequency domain transformation on the plurality of filtered channel impulse responses to obtain the CFRs of the frequency bands corresponding to the plurality of signals.

16. The non-transitory computer readable storage medium according to claim 15, wherein to determine the coarse delay estimate of the full bandwidth based on the plurality of signals, the network device is caused to:

separately perform channel estimation on the plurality of signals to obtain the channel impulse responses of the frequency bands corresponding to the plurality of signals;

separately perform coarse delay estimation based on the channel impulse responses of the frequency bands corresponding to the plurality of signals to obtain a plurality of coarse delay estimates, wherein the plurality of coarse delay estimates are in a one-to-one correspondence with the channel impulse responses of the frequency bands corresponding to the plurality of signals; and determine the coarse delay estimate of the full bandwidth based on the plurality of coarse delay estimates.

17. The non-transitory computer readable storage medium according to claim 15, wherein the coarse delay estimate of the full bandwidth is a coarse delay estimate corresponding to one of the plurality of frequency bands; or the coarse delay estimate of the full bandwidth is a value obtained by performing weighted combining on some or all of the coarse delay estimates corresponding to the plurality of frequency bands.

18. The non-transitory computer readable storage medium according to claim 14, wherein to determine the time of arrival estimate based on the CFR of the full bandwidth, the network device is caused to:

divide the CFR of the full bandwidth to obtain a plurality of subsequences, wherein each of the plurality of subsequences comprises a partial CFR of each of the plurality of frequency bands; and determine the time of arrival estimate based on the plurality of subsequences.

19. The non-transitory computer readable storage medium according to claim 18, wherein to determine the time of arrival estimate based on the plurality of subsequences, the network device is caused to:

determine an autocorrelation matrix corresponding to each of the plurality of subsequences to obtain a plurality of autocorrelation matrices corresponding to the plurality of subsequences;

determine, based on the plurality of autocorrelation matrices, a delay corresponding to a peak point of a channel delay pseudospectrum; and determine the time of arrival estimate based on the delay.

20. The method according to claim 2, wherein the coarse delay estimate of the full bandwidth is a value obtained by performing weighted combining on some or all of the coarse delay estimates corresponding to the plurality of frequency bands.

* * * * *